United States Patent [19]

Moore et al.

[11] Patent Number: 4,763,285

[45] Date of Patent: Aug. 9, 1988

[54] HELICOPTER LOW-G MONITOR, RECORDER AND WARNING SYSTEM

[75] Inventors: M. Samuel Moore; Charles F. Paluka, both of Northridge, Calif.

[73] Assignee: Semco Instruments, Inc., Valencia, Calif.

[21] Appl. No.: 897,994

[22] Filed: Aug. 19, 1986

Related U.S. Application Data

[63] Continuation-in-part of Ser. No. 784,724, Oct. 4, 1985.

[51] Int. Cl.⁴ ............ G06G 7/48; G08B 23/00; G01C 21/00
[52] U.S. Cl. ............ 364/551; 364/424; 73/178 H; 340/963
[58] Field of Search ............ 340/946, 963; 73/178 H; 360/5; 244/17.13; 364/424, 424.1, 426, 551

[56] References Cited

U.S. PATENT DOCUMENTS

| | | | |
|---|---|---|---|
| 4,115,755 | 9/1978 | Cotton | 364/426 |
| 4,258,421 | 3/1981 | Juhasz et al. | 364/424 |
| 4,300,200 | 11/1981 | Doe | 364/424.1 |
| 4,382,283 | 4/1983 | Clelford et al. | 364/424 |

Primary Examiner—Parshotam S. Lall
Assistant Examiner—Ellis B. Ramirez
Attorney, Agent, or Firm—Poms, Smith, Lande & Rose

[57] ABSTRACT

When helicopters are accomplishing certain special maneuvers such as powered descent, or the like involving low "g" conditions, the helicopter blades may teeter excessively with respect to the mast, and under severe conditions, the mast may shear. To sense such low "g" conditions, which may be dangerous, an accelerometer is mounted on the helicopter frame close to the center of gravity of the helicopter and is coupled to data processing circuitry which classifies the low-g conditions in bands or levels of severity, recording the duration of exceedances in which the low-g conditions are below predetermined levels, and issues warning signals to the helicopter pilot through the helicopter intercom system and a suitable warning light.

19 Claims, 21 Drawing Sheets

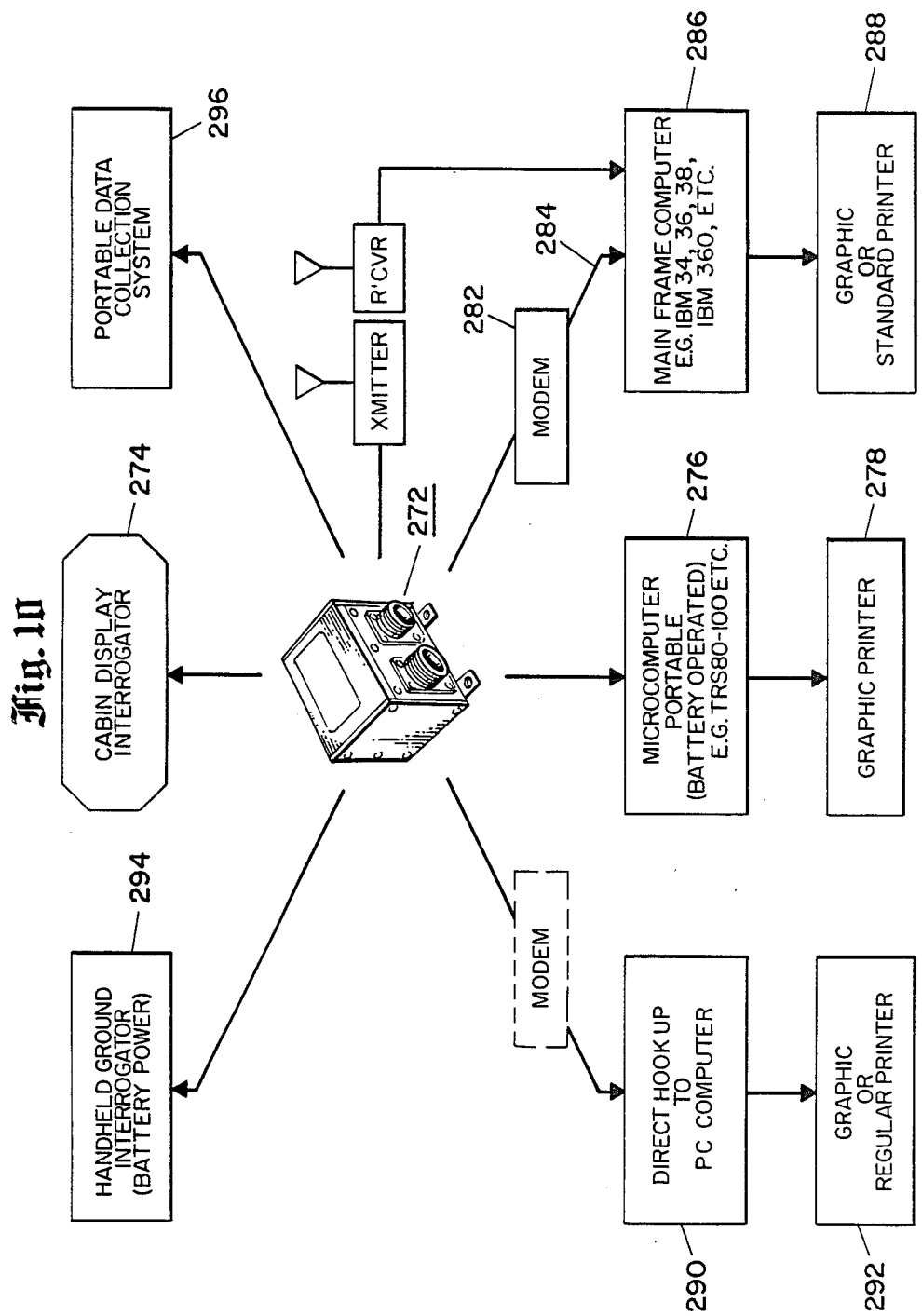

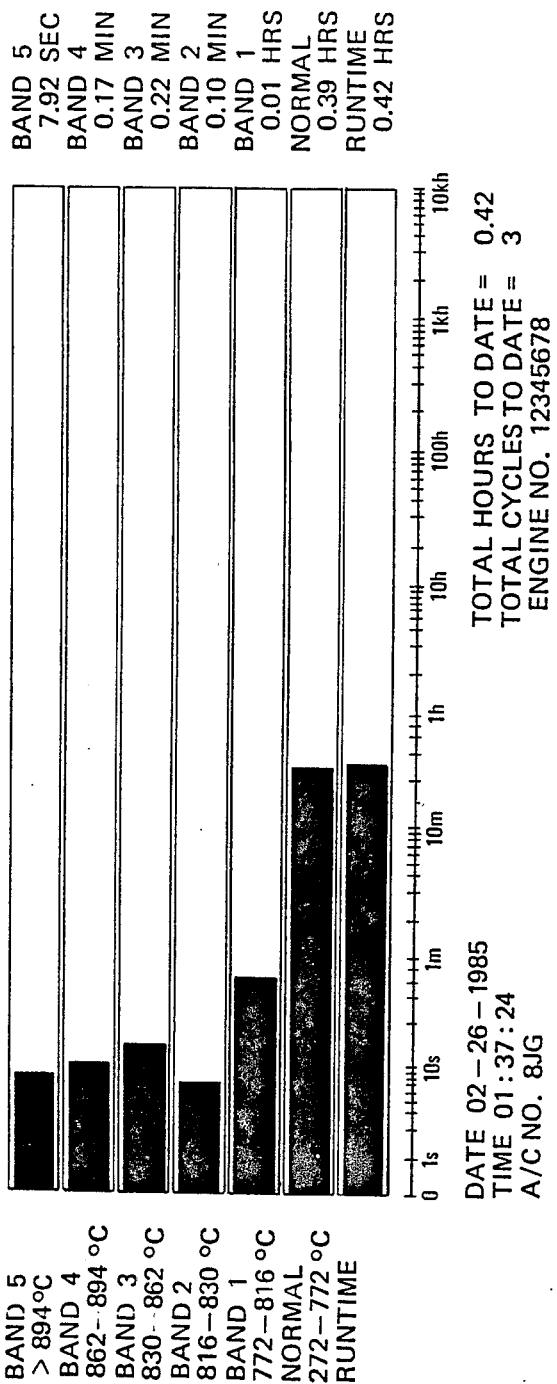

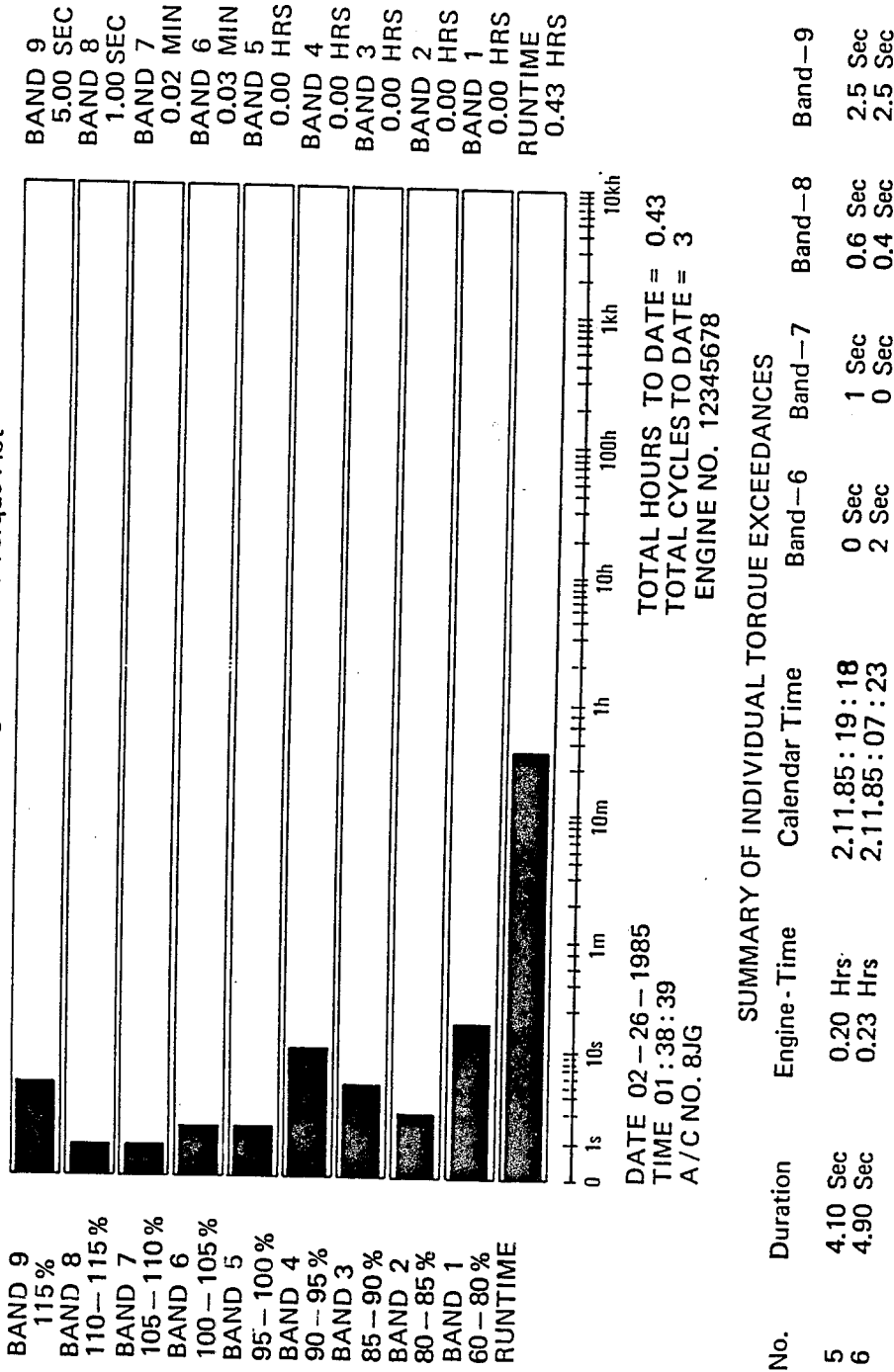

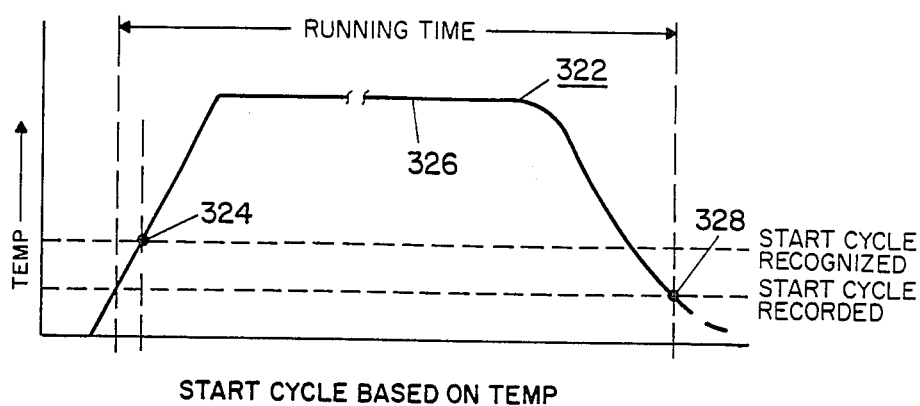
Fig. 16A — START CYCLE BASED ON TEMP
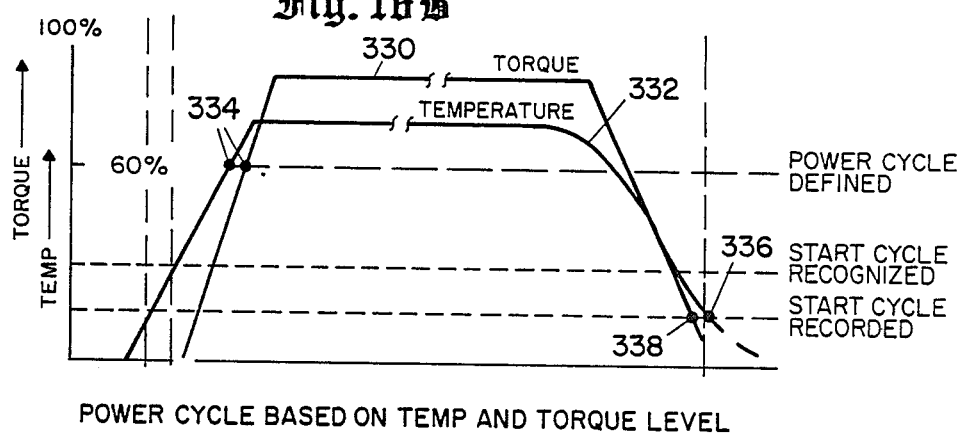
Fig. 16B — POWER CYCLE BASED ON TEMP AND TORQUE LEVEL
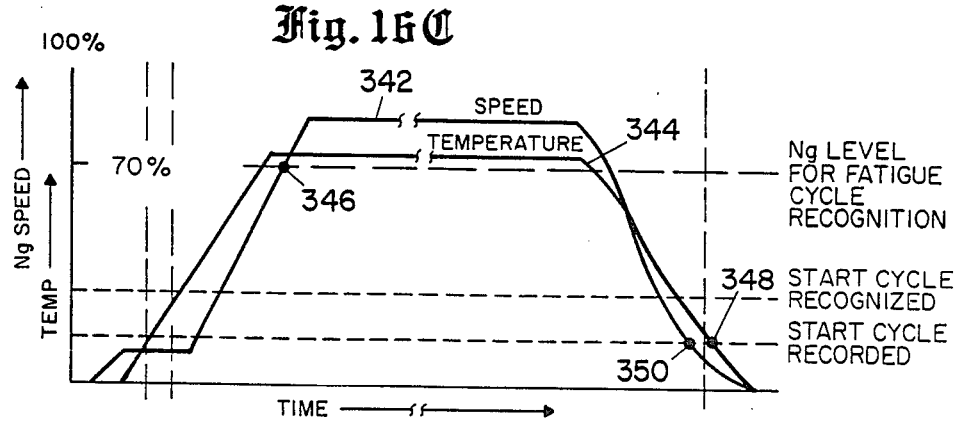
Fig. 16C — LIFE FATIGUE CYCLE BASED ON TEMP AND Ng SPEED

HELICOPTER LOW-G MONITOR, RECORDER AND WARNING SYSTEM

RELATED APPLICATIONS

This patent application is a continuation-in-part of U.S. patent application Ser. No. 784,724, filed Oct. 4, 1985.

FIELD OF THE INVENTION

This invention relates to helicopter warning systems.

BACKGROUND OF THE INVENTION

Helicopter blades are mounted by a yoke or head coupling the blades to the mast or drive shaft connected to the helicopter fuselage. The blades and the central head are free to teeter or tile by a small angle relative to the mast. Under normal conditions when the blades are exerting lift on the helicopter fuselage, the helicopter is in a relatively stable condition, and the helicopter mast does not normally teeter excessively relative to the helicopter blades. Incidentally, stops are provided within the yoke or head, to limit the tilting or teetering of the blades relative to the mast. Incidentally, when a helicopter is hovering at a fixed location the "g" force or the acceleration in the helicopter is equal to that of gravity and is equal to 1-g. Under low-g conditions such as a powered descent, the helicopter is less stable because the blades are unloaded of lift, and the blades may tilt excessively relative to the helicopter mast. Further, under severe low-g conditions, and if these conditions are combined with excessive pilot control maneuvers, the rotor head stops are forced into contact with the mast with excessive force to create a bending moment on the mast. Under extreme conditions, the mast may shear, with disastrous results.

SUMMARY OF THE INVENTION

Accordingly, a principal object of the present invention is to provide an integrated digital system for detecting, and measuring dangerous low-g conditions and for warning the pilot when such low-g conditions are present. The present invention contemplates the integration of a low-g warning system into a comprehensive digital engine monitoring and recording system.

In a preferred embodiment of the invention, dangerous low-g bands or levels are established and guarded, and the elapsed time is measured during which the helicopter is in each of these bands. Further, when a predetermined dangerous low-g level is reached, warning signals are supplied to the helicopter pilot so that he may correct the situation on a timely basis.

The low-g measurement system preferably includes an accelerometer, a low-pass filter to filter out the blade frequency impulses, and a system data processor including a multiplex input to which the low-g signal is supplied, digital-to-analog conversion circuitry, random access and permanent memory, and with the system being under the control of a micro-computer, operating in accordance with instructions from a programmable read-only memory (PROM).

The details of specific recent exceedances, and the total time in the various low-g bands may be permanently stored for subsequent monitoring, review and analysis.

Other objects, features, and advantages will become apparent from a consideration of the following detailed description and from the accompanying drawings.

BRIEF DESCRIPTION OF THE DRAWINGS

FIG. 10 is a system diagram showing the coupling of the stored information to remote data processing and/or display or graphics equipment;

FIGS. 14 and 15 are plots of total exceedances and tabulations of individual exceedances for temperature and torque, respectively;

FIGS. 16A–16C are graphs showing how start and power cycles are determined;

DETAILED DESCRIPTION

Figure 25:
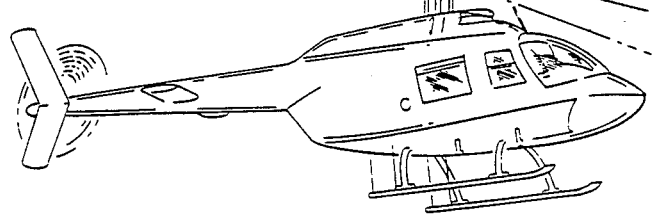
FIG. 25 shows a typical helicopter with which the system of the present invention may be used.

As mentioned hereinabove, the present application is a continuation of U.S. patent application Ser. No. 784,724, filed Oct. 4, 1985. The present invention primarily relates to a low-g system addition for monitoring, recording and warning relative to helicopters, of the type shown in FIG. 25 of the present drawings. FIGS. 1–8 and 10 through 24 were included in the parent patent application, along with the major portion of FIG. 9B including all components with reference numerals below 300. In the following detailed description the bulk of the detailed description relating to the overall system will be included directly. Thereafter, the additional circuitry for integrating the helicopter low-g system into the overall system will be described in connection with FIGS. 9A, 9B, and 25.

Figure 1:
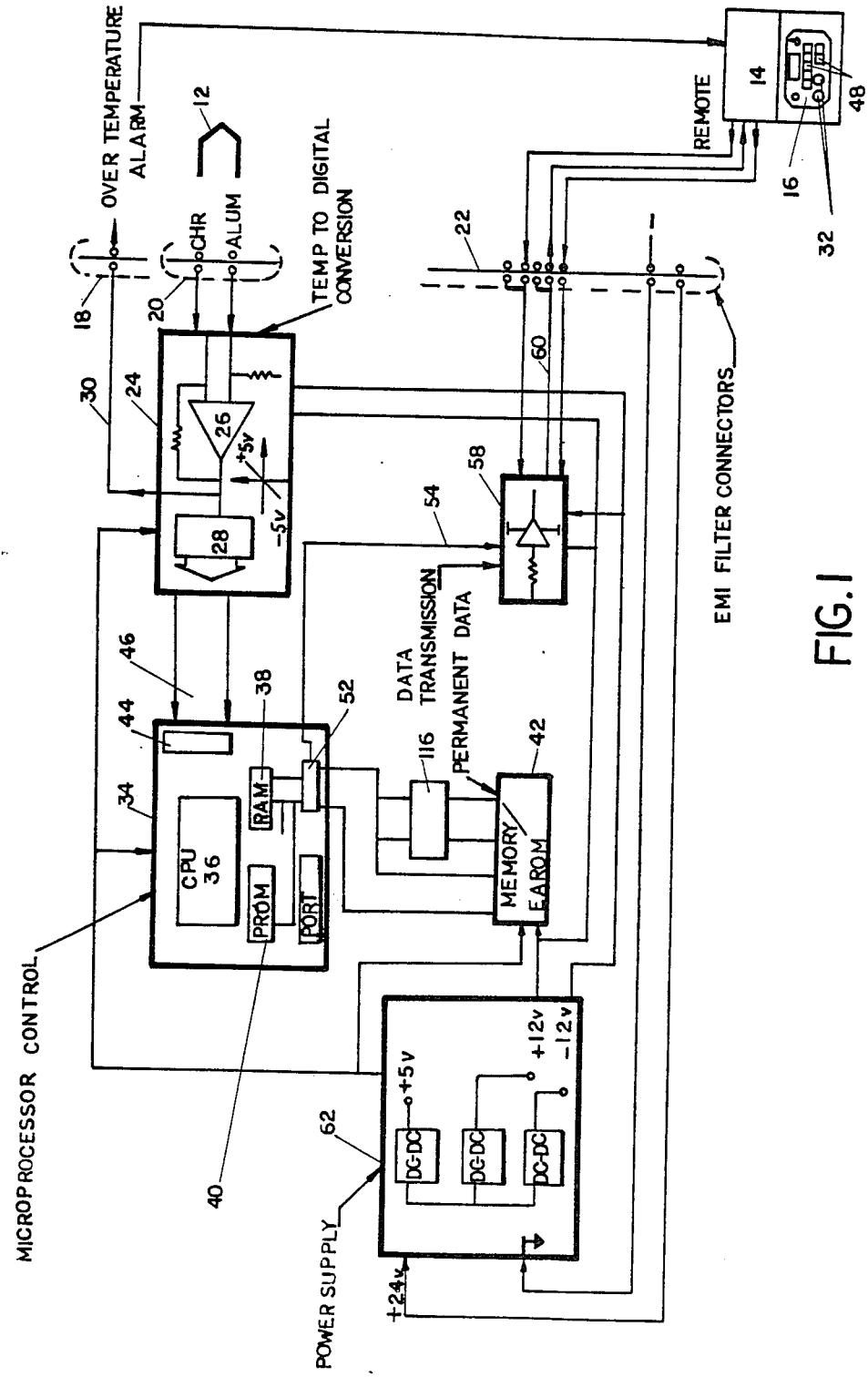
FIG. 1 is a block circuit diagram showing one illustrative embodiment of the present invention.

Referring more particularly to the drawings, FIG. 1 essentially shows the engine mounted electronic unit, 30 with only the thermocouple 12 and the remote electronic unit 14 with its associated display 16 being schematically shown to the right in FIG. 1 outside of the electronic connections 18, 20 and 22.

The input from thermocouple 12 is processed in unit 24 which includes an operational amplifier 26 which receives and amplifies the signal from thermocouple 12, and the analog to digital converter 28 which provides 10 binary digits or bits as an output signal indicating the temperature level. An over-temperature alarm signal is routed on lead 30 through connector 18 to the remote unit 14 where over-temperature alarm lights 32 signal excessive temperature for the left or the right engine.

The electronic unit 34 includes a data-processor having a central processing unit 36, a random access memory 38 and a program read-only memory 40. A non-volatile memory 42 is employed to store cumulative, long-term temperature information of the history of the turbine engine with which the electronic unit is associated, as more fully described below.

Now, in Table I set forth below, a typical table of temperature channel specifications is set forth. This temperature specification table includes the channels of information which may be obtained and displayed in the display unit 16. More specifically, the temperature channel specifications as set forth in Table I indicate a discrete set of temperature bands. Thus, for example, temperature channel 3 relates to the temperature range between 819.5° C. and 830.8° C. Included in the PROM 40 is a table indicating these temperature bands and limits as set forth in Table I. The information from the analog-to-digital converter 28 as supplied to the input-/output circuit 44 over bus 46 is periodically sampled and compared with the temperature bands as set forth in Table I and as included in the PROM 40. Within the non-volatile memory 42 are a set of memory storage locations corresponding respectively to each of the many channels included in Table I. Following the comparison step mentioned above, the channel or channels which are involved are identified, and the information is withdrawn from memory 42 and held in local storage, and is incremented by a time interval corresponding to the processing and sampling rate of the microprocessor 34. The modified or incremented information is then returned to the storage unit 42, so that the total time in each over-limit temperature band or range is continuously available.

TABLE I

| | | TEMPERATURE CHANNEL SPECIFICATIONS | | | |
|---|---|---|---|---|---|
| Temperature Channel | Function | Temperature Band Limits ±5° C.* | | Resolution Time Recording* | Display Format |
| | | (Lower) | (Upper) | | |
| 1 | Number of Starts | 300° C. | — | — | 99999 cycles |
| 2 | Running Time | 300° C. | — | 0.1 hours | 9999.9 hours |
| 3 | Total Time over 819.5° C. | 819.5° C. | 830.8° C. | .01 hours | 999.99 hours |
| 3A | Time Exceeding Band Limits | 819.5° C. | 830.8° C. | .01 hours | 999.99 hours |
| 4 | Time Exceeding 830.8° C. | 830.8° C. | 838.0° C. | .001 hours | 99.999 hours |
| 4A | Time Exceeding Band Limits | 830.8° C. | 838.0° C. | .001 hours | 999.99 minutes |
| 5 | Total Time over 838.0° C. | 838.0° C. | 849.3° C. | .01 minutes | 999.99 minutes |
| 5A | Time Exceeding Band Limits | 838.0° C. | 849.3° C. | .01 minutes | 999.99 minutes |
| 6 | Time Over 849.3° C. | 849.3° C. | — | .01 seconds | 999.99 seconds |

*Limits subject to engine manufacturer requirements.

The foregoing steps are set forth in slightly different format in Table II:

TABLE II

1. Periodic Sampling of Temperature or Other Parameter Input
2. Digital to Analog Conversion
3. Comparator Step.
4. Identification of Memory Locations for Time Information for Each Specific Temperature or Other Parameter Range
5. Withdrawal of Stored Information From All Associated Temperature or Other Parameter Channels.
6. Incrementing of Data from these relevant Memory Locations.
7. Return of Modified Channel Information to Memory Storage Locations in Non-Volatile Memory.
8. For (A) Channels, an Allowable Time Period is Substracted From the Increment by Which the Stored Time is Increased.

When information is ordered up by the actuation of one of the switches 48 associated with the remote electronics and display unit 14, the information is transmitted from the non-volatile memory on the data bus 50 to the 8 bit storage and shift register unit 52. The information is then transmitted serially on lead 54 to the output driver 58 and is transmitted on lead 60 to the remote electronics and display unit 14,16.

The power supply 62 is conventional and merely converts from the 24 volt aircraft power supply to the plus and minus 12 volts required for operation of the electronic circuitry and to the +5 volt power required for certain of the additional circuits.

Figure 2:
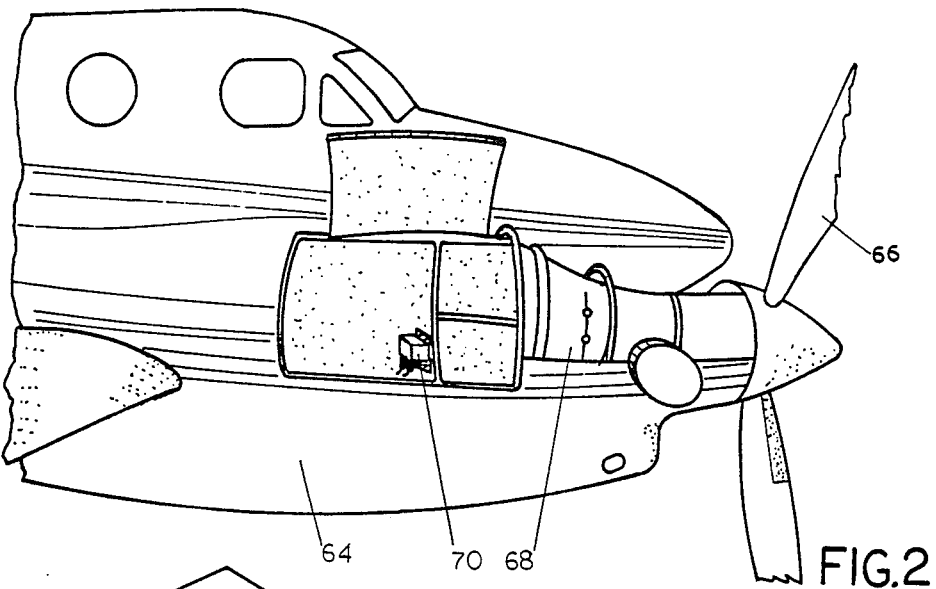
FIG. 2 is a schematic showing of a two-engine aircraft in which the propellers are powered by turbine engines.

FIG. 2 is showing of a prop jet aircraft in which the aircraft 64 is driven by the propeller 66 powered from the turbine engine 68. The aircraft 64 is shown as a twin-engine plane, with the other engine being located beyond the main fuselage. In FIG. 2 the one engine-mounted electronics unit 70 is shown, and there is of course another one mounted in the left engine. The circuitry as shown in FIG. 1 is that which is included within the unit 70, while the thermocouple 12 (which may represent a series of thermocouples) is mounted adjacent to the engine 68, normally near the exhaust or at an inter-stage location of this engine. The single remote unit 14 with the associated display 16 and switches 48, may be mounted within the cockpit compartment, or may be a portable test unit provided for maintenance and repair. In either case, both of the two engine mounted units are connected to a single remote unit 14, 16.

Figure 3:
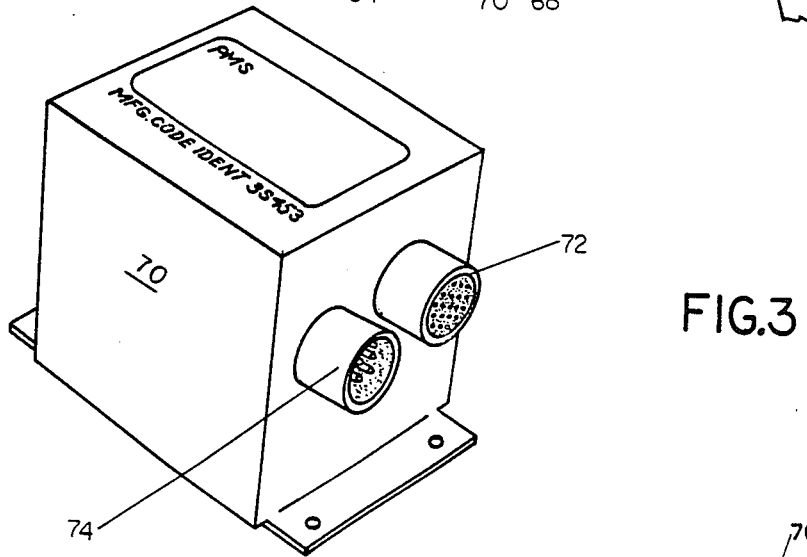
FIG. 3 is an exterior view of an engine mounted electronic unit.

FIG. 3 shows the exterior configuration of an engine mounted unit 70 including the terminal plugs 72 and 74.

Figure 4:
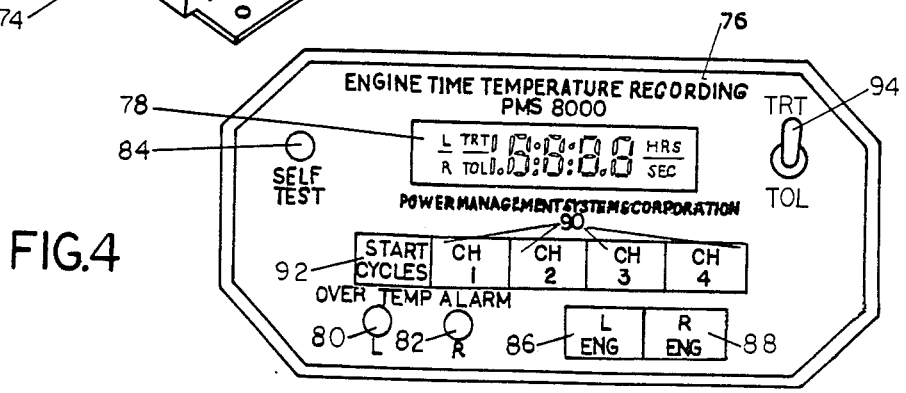
FIG. 4 shows a display and switching panel which may be mounted either on the instrument panel in the airplane cockpit, or in a remote portable test unit.

FIG. 4 shows the display which may be part of the instrument display in the cockpit or may be included on the portable test unit which may be used for ground servicing. The display panel 76 includes the digital display 78, the over-temperature alarm signals 80 and 82 for the left and the right engines, respectively, the self-test switch and signal 84, the push-button switches 86 and 88 for the left and the right engines, respectively, and the channel selection switches 90. At the left hand end of the row of channel selection switches 90 is the additional switch 92 designated "start cycles", and depressing this pushbutton switch causes a number to appear on the display unit 78 representing the number of times that the temperature of the engine has risen to a temperature above 300° C., a very low temperature for a turbine engine, and then returned to a temperature below this level. The switch 94 may be used with each channel and indicates either the total time over limits ("TOL", which refers to the length of time beyond the manufacturers rated time of operation in the particular temperature band); and the switch position designated "TRT" which indicates the total running time over the minimum temperature of the band under consideration.

Figure 5A:
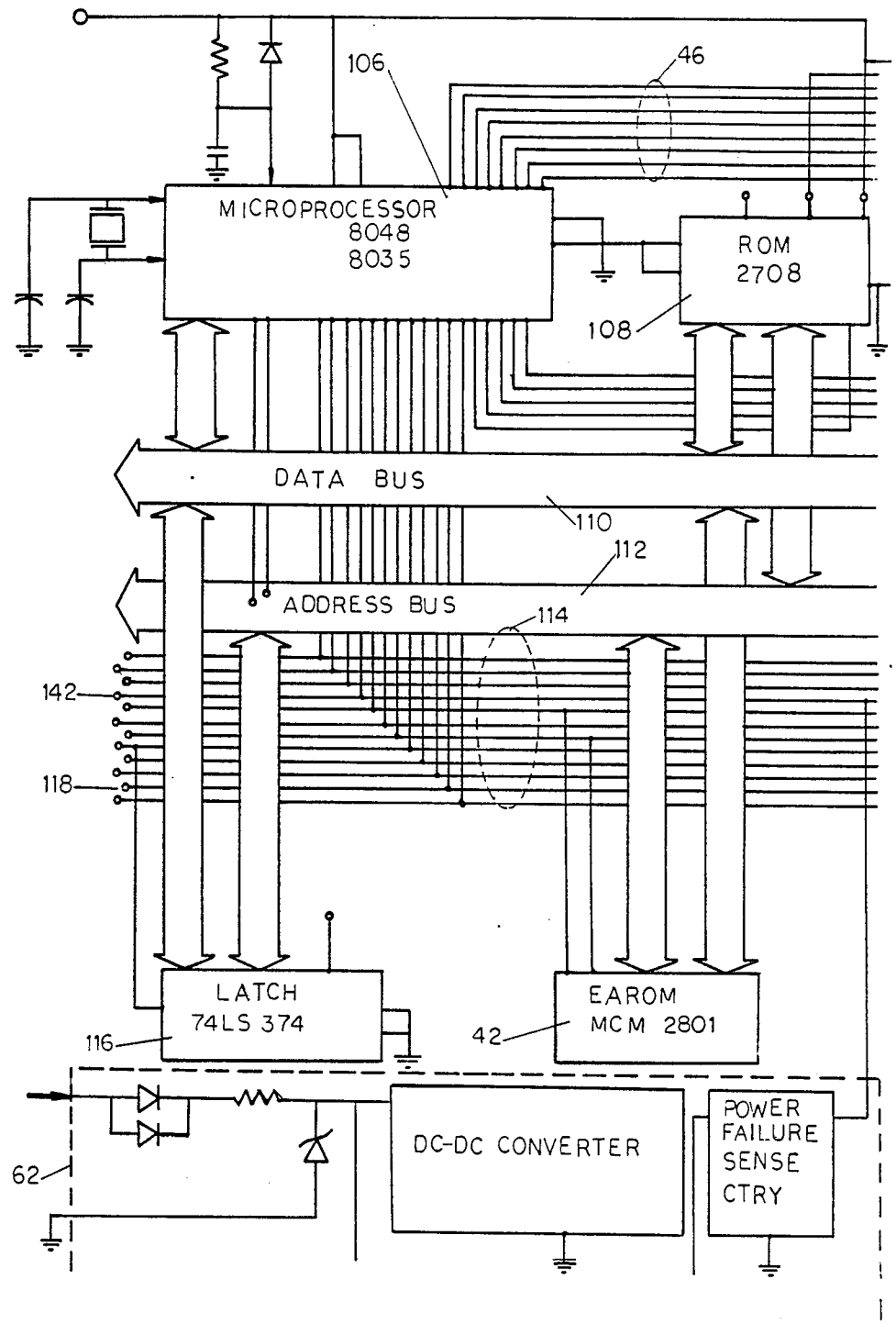
FIGS. 5A and 5B are circuit diagrams indicating the actual circuitry included within the engine mounted electronics units.
Figure 5B:
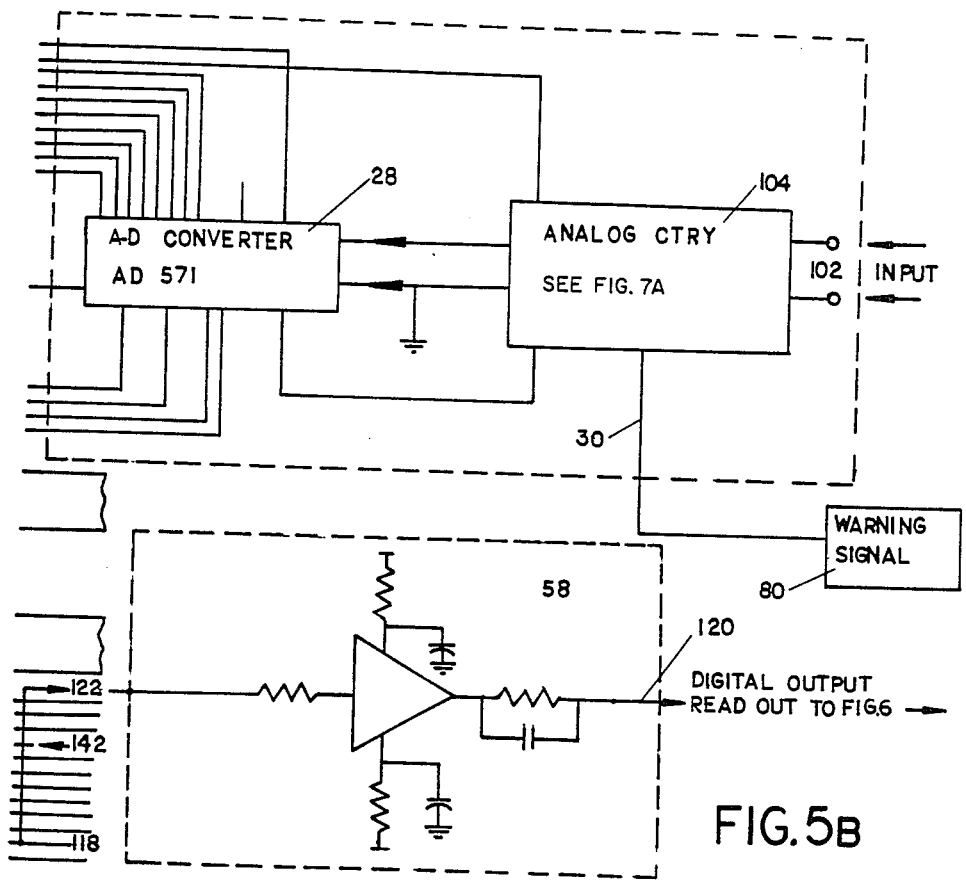

Now, turning to FIGS. 5A and 5B, this is a somewhat more detailed showing of the circuit of FIG. 1. More specifically, the output from the thermocouple is applied to the terminals 102 at the input to the analog circuit 104. Incidentally, this analog circuit 104 will be shown in greater detail in connection with FIG. 7, and serves to compensate and amplify the temperature signal provided by the thermocouple. The output from the analog circuitry 104 is applied to the analog-to-digital converter 28. The output leads 46 from the analog-to-digital converter supply a ten bit conversion of the temperature level to the microprocessor chip 106, which for example may be an Intel chip such as the 8035 or the 8048. The ROM 108 includes sequential instructions for the operation of the microprocessor 106 and for the periodic sampling of temperature data, and also includes the engine operating parameters and the limits for temperature band definition. Incidentally, in addition to just temperature data, other inputs may could be provided to the engine mounted electronic unit, such as torque and engine speed functions; and these may be converted from analog input signals to digital signals, multiplexed with the input temperature signals, supplied to the micro-processor, and eventually ordered up for display by depressing pushbuttons such as the switches 48 as shown in FIG. 1 and the switches 90 and 92 in FIG. 4, to provide additional engine monitoring functions.

Three buses which are included in FIG. 5 include the data bus 110, the address bus 112, and the control bus 114; and data carried on the data bus 110 may be supplied to or from the microprocessor 106, and to or from the EEPROM 42 which is a non-volatile memory unit, in accordance with instructions provided on the address bus 112. The letters "EAROM" stand for "Electrically Alternable Programmable Read-Only Memory". The latch 116 separates the data and address information which appears sequentially on the data bus to provide the full address information for the memory 42. It may be noted that the serial transmission line or port 118 included in the control bus 114 is employed to direct serial output signals to the output driver 58 which amplifies the data which has been ordered up by depressing selected keys or switches on the display unit, and transmits this data on a serial basis over output lead 120. The lead 122 connects the data lead 118 to the output driver 58. It is to be noted that parallel data transmission is also feasable, but serial transmission is more economical from a cabling point-of-view.

It is also noted that the lead 30 connected from the analog circuitry 104 extends in due course to the remote warning lamp 80′, which also appears as light 80 in FIG. 4. This signal is actuated when the temperature exceeds the maximum temperatures as shown in FIG. 7, to be discussed in greater detail below.

Figure 6:
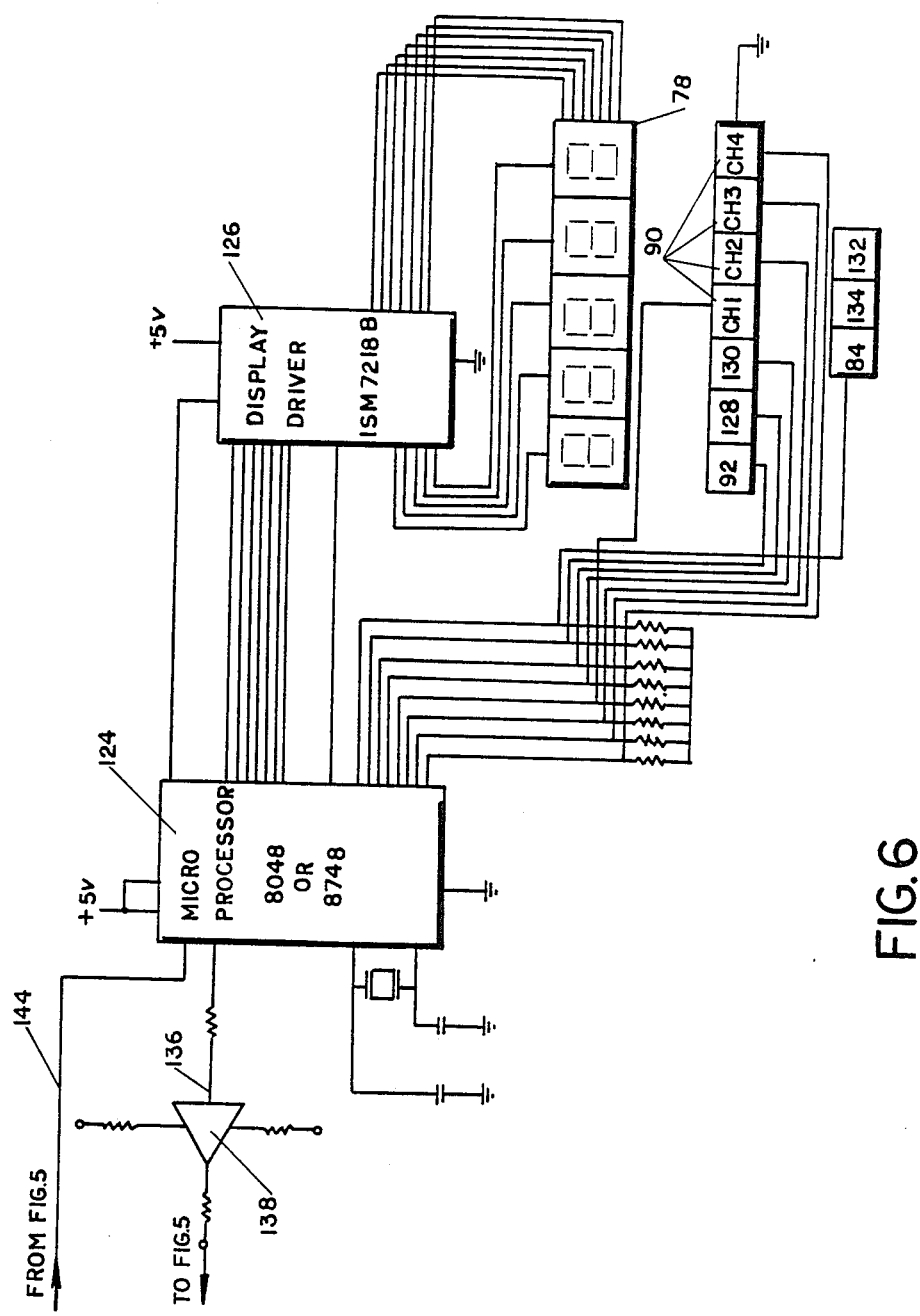
FIG. 6 shows typical electronics which may be included in the remote unit.

FIG. 6 shows the remote circuitry which may be either cockpit mounted, or be included in a ground portable model which may be selectively plugged in to the engine mounted units on the left and right engines. FIG. 6 includes the microprocessor 124 and the display driver 126 in addition to a five-digit display 78 and the switches 90, 92, 128 and 130. Additional switches include the self-test switch 84 and the power on and off switches 132 and 134.

When one of the temperature channel switches 90, together with one of the switches 128 or 130 is selected, the appropriate interrogation signal is supplied from microprocessor 124 (which includes memory) over lead 136 through amplifier 138 to the interrogation lead 140 which is connected to the interrogation input lead 142 included in the control bus 114. The appropriate information is then ordered up from the non-volatile memory 42 and is transmitted in serial form over leads 118, 122, and 120 to input lead 144 to the microprocessor chip 124 in the remote unit. The display driver 126 is then energized in accordance with conventional and known digital data-processing techniques to display the transmitted data on the display 78.

Figure 7A:
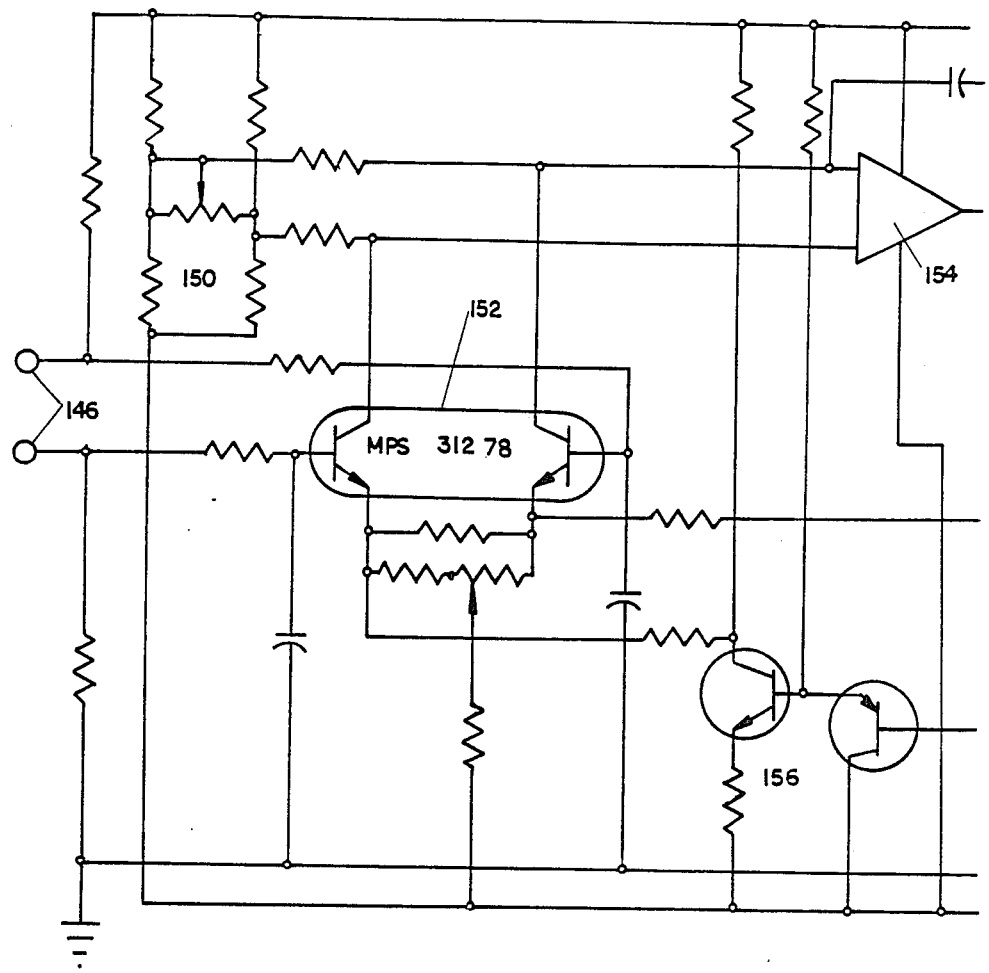
FIGS. 7A and 7B are a detailed circuit diagram showing the amplification and analog-to-digital conversion circuitry which modifies the input temperature signal from the thermocouple.
Figure 7B:
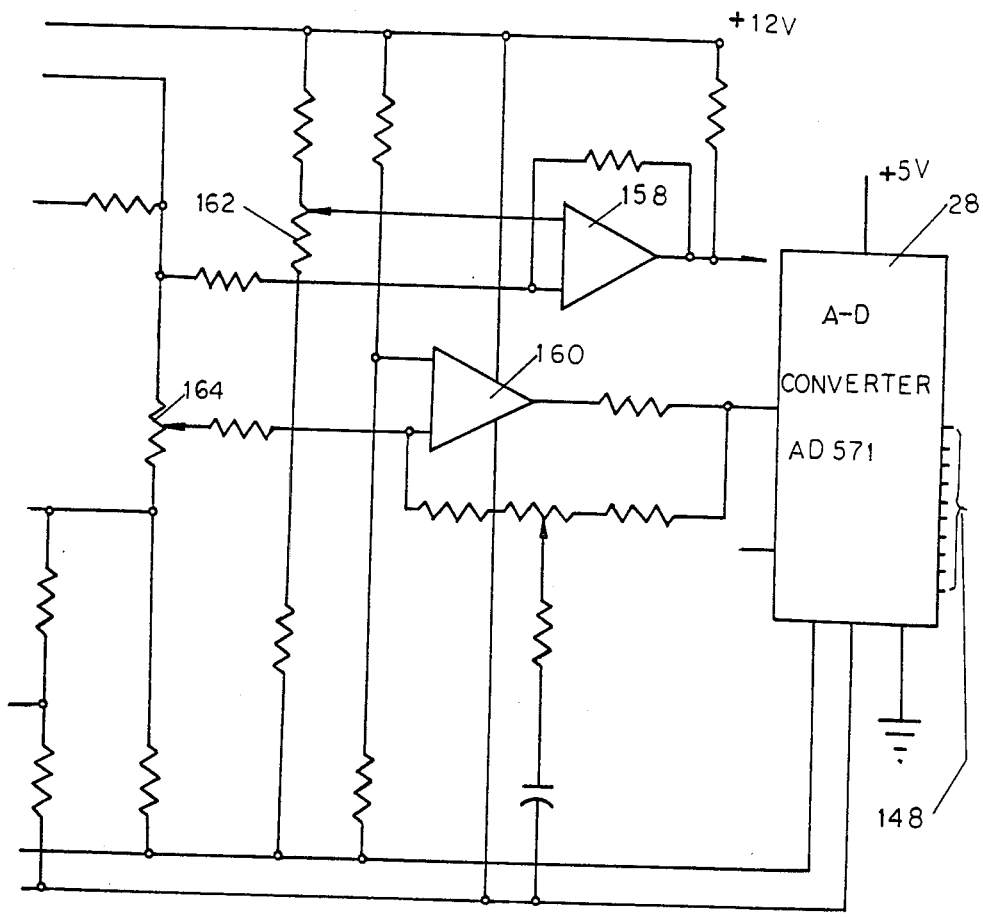

Turning now to FIGS. 7A and 7B, this input circuit has a thermocouple input to the terminals 146, and a digital temperature output at the far right-hand side of FIG. 7 at the leads 148 from the analog to the digital converter unit 28. The circuitry includes the thermocouple cold-junction temperature compensation bridge 150 and the differential amplifier 152. The output signal from the differential amplifier 152 is amplified by operational amplfier 154 which provides at its output a substantially linear voltage representing the temperature of the turbine engine. Incidentally, a constant current source 156 is included in the circuitry to control emitter current flow in differential amplifier 152. The operational amplifier 158 drives the over-temperature alarm light 80 or 82 as shown in FIG. 4. The operational amplifier 160 couples the output from operational amplifier 154 to the analog-to-digital converter 28. Incidentally, the levels for the temperature alarm signal and for the input to the analog-to-digital converter are established by the potentiometers 162 and 164, respectively. These may of course be adjusted and calibrated to give the desired signal at the proper temperature levels, and to accommodate slight variations in thermocouple output or in the amplification provided by the input circuitry, for example. The output leads 148 at the right-hand side of FIG. 7 are coupled to the 10 bit data bus 46 as shown in FIG. 1.

Figure 8:
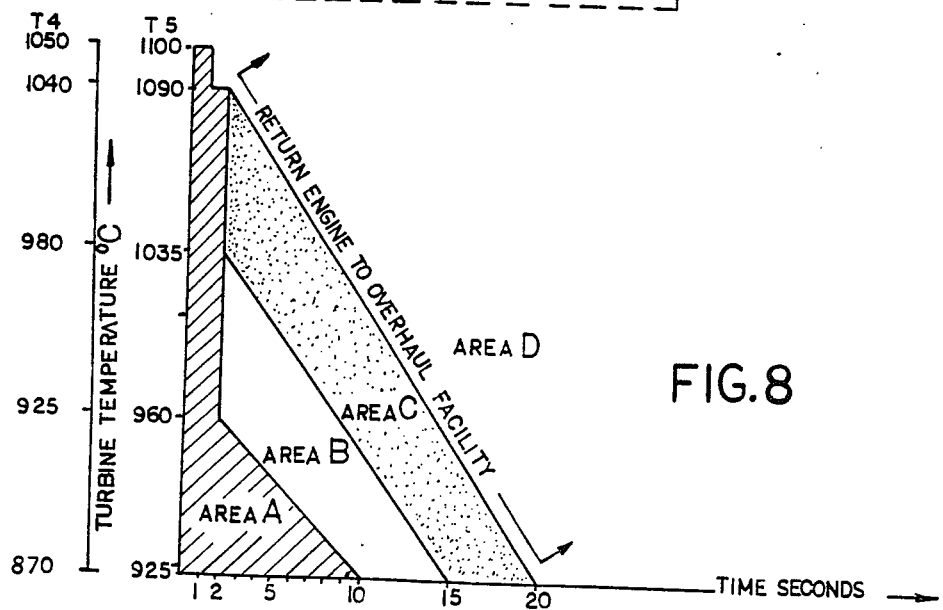
FIG. 8 is a plot indicating the over-temperature ranges for a typical turbine engine, with the allowable time at each temperature level being plotted against turbine temperature.

With reference to FIG. 8, this drawing indicates a typical manufacturer's diagram of over-temperature conditions which may be damaging to the turbine engine in the event that they last longer than certain predetermined limits. First, it may be noted that the horizontal axis of the plot inicates the time in seconds, and the vertical axis of the plot is the temperature in degrees centrigrade. The temperature scale has two different plots, one designated T-4 and the other designated T-5. The reason for the different scales involves the different temperatures at successive points along the turbine engine, from T-1 at the engine inlet to T-6 or T-7 at the exhaust. The thermocouple may be located at any of several points at or following the combustion zone, to indicate the engine operating temperature, but the temperatures sensed at these various points will vary significantly, from the turbine inlet point to the turbine inter stage temperature point, to the exhaust zone, and the circuitry must be adjusted to correspond to the actual physical locations of the thermocouple along the turbine engine.

Now, referring to FIG. 8 in more detail, the area indicated by the designation "Area A" in FIG. 8 is a permitted area. This means, for example, that at a T-5 temperature of 930° C., just over the 925° C. initial point in the characteristic, the engine may be operated for 10 seconds and not be damaged or require maintenance. However, beyond this time interval, when it goes into "Area B", certain inspection steps should be taken. Similarly, for Areas C and D, successive more complete inspections and overhaul may be required. More specifically, for Area B it is recommended that the cause of the overtemperature be determined and corrected and that the engine be visually inspected through the exhaust ports of the power turbine blades and through the exhaust duct, turning vanes where appropriate; and a record should be made in the engine log book. For Area C, a hot section inspection should be performed; the compressor blades should be stretch checked without removing the blades from the disk; and a fluorescent penetrant inspection should be made of the compressor turbine and power turbine discs and blades without removing the blades from the disks. For Area D, the engine should be returned to an overhaul facility, the compressor turbine blades and power turbine blades must be discarded, and both of the turbine discs must be subjected to a stretch check and fluorescent penetrant inspection.

Concerning the "time over limits" channels such as 3A and 4A, on each occasion when the engine temperature goes up to an elevated level and remains there for more than the indicated time interval, this time period beyond the allowable time period is recorded and added to that previously stored in the non-volatile memory. Thus, for exampl, if an engine were permitted by the manufacturer's specifications to remain at a temperature corresponding to channel 5A for 10 seconds, and it actually remained at a temperature above the minimal level or channel 5A for 15 seconds, then 5 seconds would be added to the value stored in the non-volatile memory for channel 5A.

It may also be noted that during the first time that the engine is operated overlimits, that the information stored in the permanent memory will represent a complete history of the exceedance, including the times that the engine was operated in each of the overlimit bands.

Figure 9A:
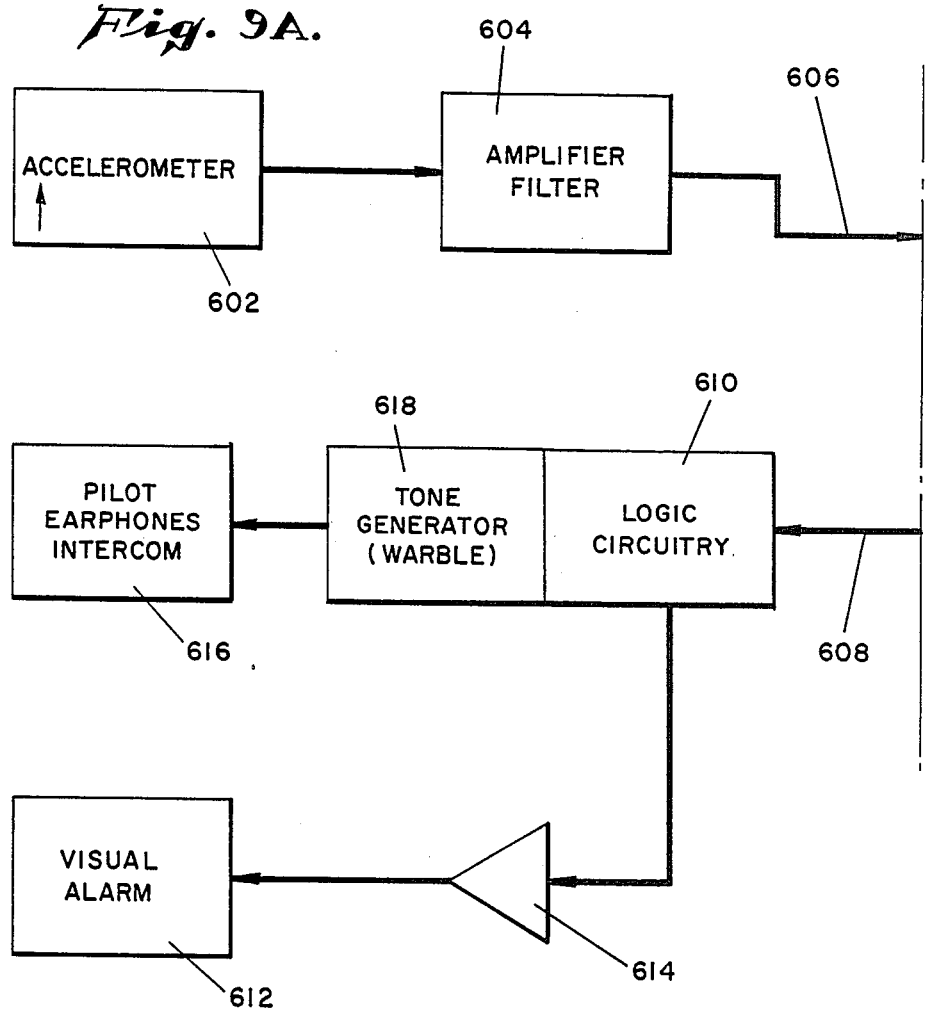
FIGS. 9A and 9B together form a block circuit diagram of a comprehensive monitoring system illustrating the invention.
Figure 9B:
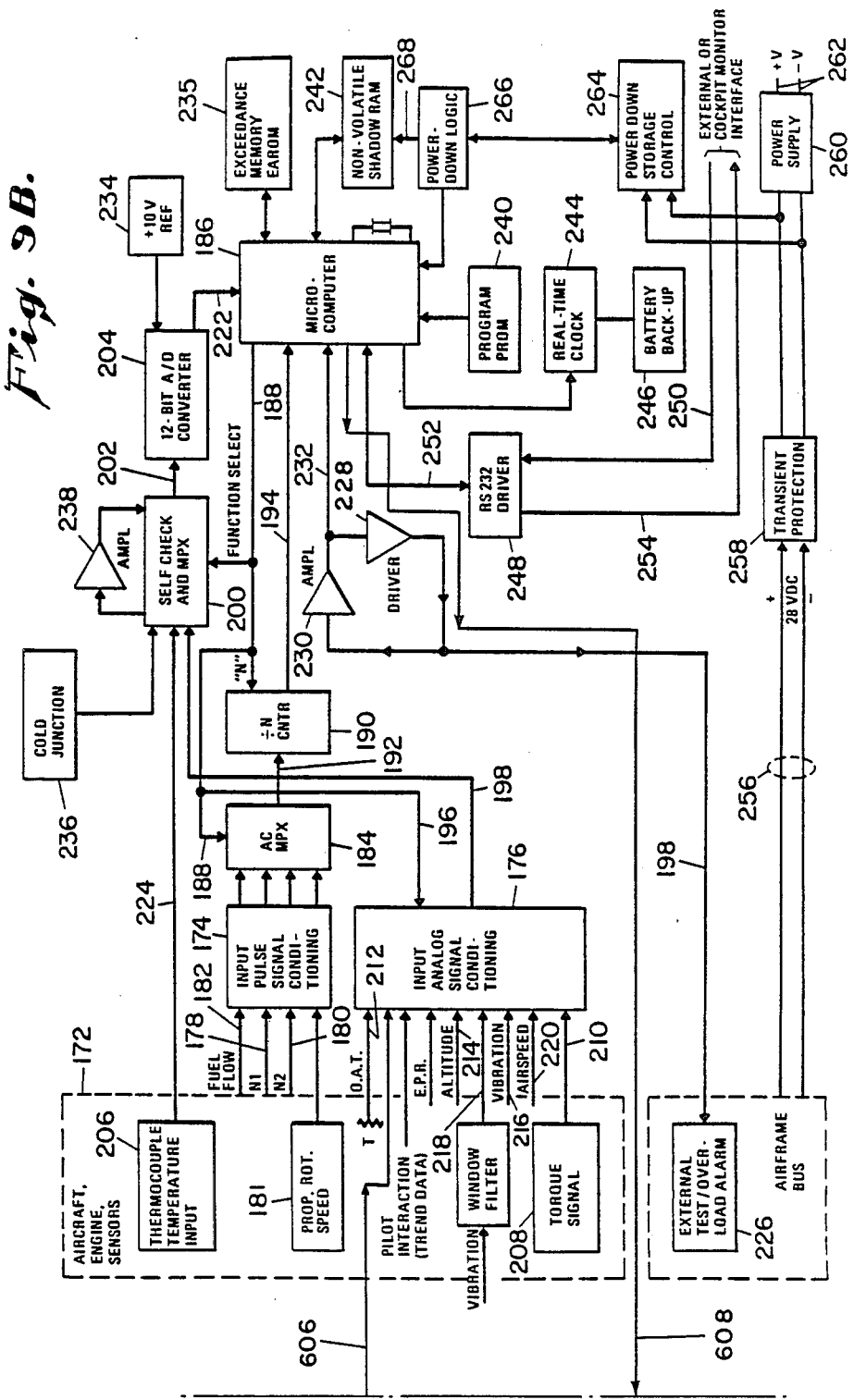

In FIGS. 9A and 9B a block diagram of a comprehensive, or over-all engine monitoring and recording system is disclosed. As noted above, the circuit of FIG. 9B and those components having reference numerals below 300 will now be considered, with FIG. 9A and higher numbered reference number items being discussed toward the end of this specification. Considering the details of FIG. 9B, the aircraft engine and associated sensors are indicated to the left in FIG. 9B at reference numeral 172. There are two principal types of input signals from the aircraft engine to the digital circuitry constituting the bulk of FIG. 9B. These are pulse input signals received at circuit 174 in which the input pulse signals are conditioned for use by the digital circuitry, and the inputs to circuit 176 wherein input analog signals are processed, and conditioned for further processing.

Considering first the pulse input signals, they include the speed output quasi-sine wave signals on leads 178, 180, and 181 (when a prop-jet is involved), and the fuel flow input pulses from lead 182 as picked up by a rotary flow sensor. These output signals are limited and supplied to the multiplexer 184. The microcomputer 186 periodically samples these signals supplied to multiplexer 184 by selection signals applied on lead 188. The division ratio of the counter 190 is selected, via the function control line 188 from microcomputer 186 to the ratio appropriate to the transducer input being selected. A square wave signal, having a frequency reduced appropriately from the quasi-sine wave input by counter circuit 190, is supplied from counter circuit 190 to microcomputer 186 on lead 194. The microcomputer times the interval between successive positive transitions of this square wave signal, and this is a function of the quantity being measured. The microcomputer 186, by applying successive different "select" signals on lead 188 to the multiplexer 184, successively selects the various pulse inputs to the multiplex circuit 184, applies them to the counter circuit 190 and stores the speed or rate of rotation information in the memory circuitry associated with microcomputer 186.

In a similar manner, the microcomputer circuit 186 provides select signals over lead 196 to the analog input signal conditioning circuit 176. These are routed via leads 198 through circuit 200 over lead 202 to the analog-to-digital converter 204. Thus, under normal operating conditions, the select signals applied on lead 196 multiplex different analog outputs signals onto lead 198.

Incidentally, the various analog signals include the thermocouple temperature input 206 which is treated specially, and coupled directly to the self-check and multiplex circuit 200; the torque sensor 208, which forms one of the inputs to the conditioning circuit 176 via lead 210 and the other analog inputs including the outside air temperature on lead 212, the altitude input on lead 214, the unfiltered vibration input on line 216, the filtered vibration output on line 218 and the air speed on line 220. Following the conversion to digital signal format in the analog-to-digital converter 204, these input signals are supplied to the microcomputer 186 on lead 222. Incidentally, many of the circuits shown as individual leads in FIG. 9B may actually be sets of parallel conductors forming a cable or bus for conducting digital signals in parallel in the form of a word or a byte of digital information.

The function of the circuit 200, designated "SELF-CHECK AND MPX" will now be briefly considered. When the data processing system is put into the self-check mode, by appropriate action of the switches to be discussed below in connection with FIG. 10 and FIG. 11 of the drawings, an internally generated voltage representing a thermocouple output voltage at a predetermined temperature is applied from the circuit 200 to the analog-to-digital converter 204, and the flow through of other information on lead 198 and 224 is blocked. The temperature read-out from the unit should then correspond to the selected thermocouple voltage level at which the self-test reference voltage is set.

The function of the circuits 226, 228 and 230 will now be briefly considered. Circuit 226 represents an alarm circuit and associated electrical circuitry for turning the light on to make sure that it is not burned out. When the local switch within circuit 226 is actuated to check the lamp to be sure that it is not burned out, a signal is supplied to amplifier 230 and the information that the testing is occurring is routed back to microcomputer 186 over lead 232. However, when the system is in an overlimit condition, a signal is applied by microcomputer 186 over lead 232 to the driver circuit 228 which energizes circuit 226 to operate the overlimit alarm light.

Also associated with the microcomputer 186 is the exceedance memory 235. When the temperature, torque, speed, vibration, or other factors being measured exceed certain pre-established limits, as discussed hereinabove for temperature, the relevant information is supplied to the exceedance memory 235. The type of information stored relative to each exceedance, is indicated in the individual summaries associated with FIG. 14, for temperature exceedances, and for FIG. 15 for torque exceedances.

In this implementation, the analog-to-digital converter has 12 binary digits or bits output in order to provide an accurate representation in digital form of a wide range of input voltages. The 10-volt reference voltage source 234 is provided to accurately calibrate or insure the accuracy of the analog-to-digital converter 204. In accordance with conventional practice in the use of thermocouples, the cold junction 236 is connected to circuit 200 to provide cold junction compensation. More specifically, the thermocouple is formed of two dissimilar metals which provide a voltage which increases as the temperature is raised. The resultant voltage which is sensed from the thermocouple depends in part on the temperature of the cold junction of the two materials of which the thermocouple and the amplifier input connections are formed. Because the ambient may vary over a substantial range, this cold junction compensation is required, with techniques for implementing it being well known in the field.

The steps of operation of the microcomputer 186 are controlled by the program memory 240 which is known in the industry as a "PROM" or Programmable Read-Only Memory. The contents of the PROM 240 involved detailed program steps, which are unique to the architecture of the microcomputer 186 which is being used. However, the over-all mode of operation of the computer 186 under control of the PROM 240 is indicated in FIGS. 17 and 18 of the drawings, to be described in greater detail hereinbelow.

The circuit 242 is a non-volatile "shadow" "RAM". Random access memories of this type are available from Hughes, Intel, National Cash, or Zicor, for example. They include a rapid access memory section, and may on command transfer all of the information to the non-volatile permanent memory section of the unit. The shadow RAM 242 is employed to hold the working information relative to engine; and may be transferred and recalled in mass between the non-volatile section and the rapid access section, thereof.

An additional exceedance memory circuit 235 is also provided for association with the microcomputer 186. This circuit 235 is a relatively large memory which can include 4,000 or 8,000 bytes of digital information. The exceedance memory 235 records individual items and it is not rewritten.

Additional circuits included in the system of FIGS. 9A and 9B include the real time clock 244 and its associated battery back-up 246. The real time clock may either provide calendar date and hours and minutes, or may be operative only when the turbine engine is an operation to provide "engine time" identification of each exceedance, as shown for example in FIGS. 14 and 15.

The system of FIGS. 9A and 9B is coupled to the "outside world" via the driver circuit 248. When command signals are received from external circuitry as indicated in FIG. 10, on lead 250, the appropriate data is obtained by the microcomputer 186 from the memory 234 or 242, and transmitted over bus 252 to driver 248 wherein the data is amplified and sent out from the system of FIGS. 9A and 9B on lead 254.

Concerning power for the system of FIGS. 9A and 9B, 28 volts direct current from the aircraft power system is supplied on leads 256. Suitable transient protection, including appropriate filtering circuitry 258 is coupled between the power input lines 256 and the power supply 260. The power supply 260 steps the voltage 256 down to lower voltages appropriate to power the components included in the data processing circuit of FIGS. 9A and 9B. These lower positive and negative voltages appear at leads 262 designated V Plus and V Minus. In order to avoid the loss of stored digital information, the circuits 264 and 266 are provided. In accordance with one function performed by the logic circuit 266, the microcomputer 186 is provided with a signal indicating loss of power. In addition, through lead 268 a special source of power, such as a large capacitor, is coupled to the non-volatile shadow RAM 242 to continue the transfer of digital information stored in the volatile rapid access portion of the memory unit into the non-volatile permanent side of the storage unit, although the other operating power is lost.

Most of the system of FIGS. 9A and 9B is mounted within a protective metal box, such as that shown at the center of FIG. 10, and this unit may be mounted within the engine compartment, and in the case of multiple engine aircraft, one such unit may be associated with each engine.

FIG. 10 is a schematic showing of various types of equipment with which the system of FIGS. 9A and 9B may be used. For convenience, the system of FIGS. 9A and 9B is shown in the center of FIG. 10 as unit 272. It will normally be connected directly to a cabin display and interrogator unit 274 which is shown to an enlarged scale in FIG. 11. Incidentally, it is again noted that the signals requesting information from the microcomputer unit 272 may be applied over lead 250 of FIG. 9B, and the digital information supplied in response to the request, is provided on output lead or bus 254.

Figure 13:
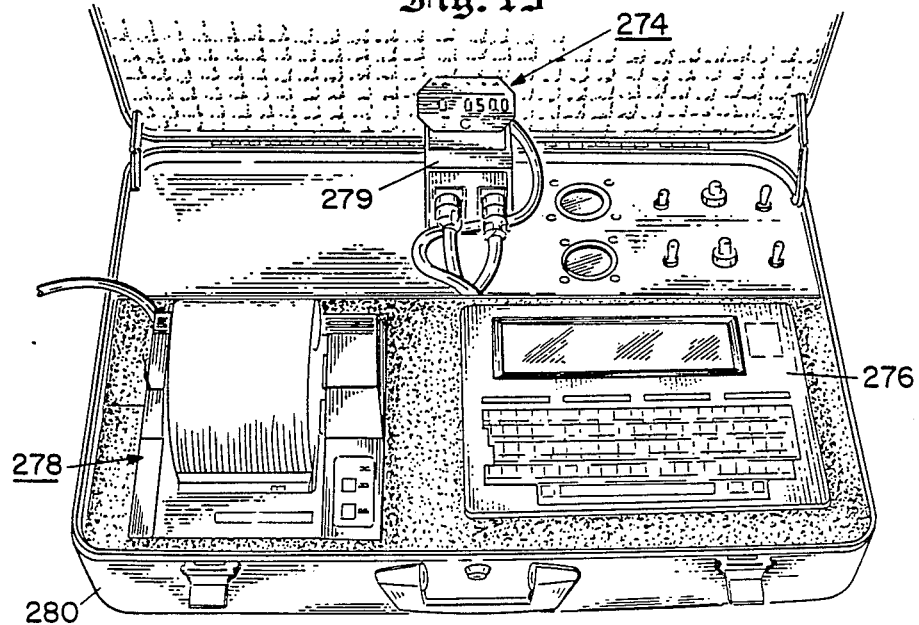
FIG. 13 shows a portable data collection and display unit.

Digital information relating to the history of the operation of any of the engines may also be supplied to units 276 and 278 which are shown in greater detail in FIG. 13. They include the Radio Shack Microcomputer TRS-80-100 as unit 276 and an associated Radio Shack graphic printer 278. As indicated in FIG. 13, these units may be mounted in a single portable carrying case or suitcase 280 which may be battery powered, to also supply power to operate unit 272, including the system of FIG. 9, even when the aircraft is not supplying power to the system.

Information may also be supplied to a modem 282 and over a telephone line 284 to a remote main frame computer 286 such as the IBM computers listed in FIG. 10. Of course, associatd with the main frame computer could be a graphic or standard printer as indicated by block 288 in FIG. 10.

As another alternative or concurrent arrangement for interrogating and receiving data from the unit 272, a direct hookup to a PC Computer, such as the IBM PC Computer, is indicated at reference numeral 290, and of course, an associated graphic unit or conventional printer 292 may also be associated with the personal computer 290. If desired, a hand-held ground interrogator 294 may be employed to receive information from the unit 272 and store it for subsequent transfer to a display or data processing system. In this way, when an aircraft is on the ground being serviced between flights, the information may be "dumped" into the interrogator unit 294, and subsequently utilized and examined in detail under more leisurely conditions. One typical interrogator is the GR Electronics Model 42C or equivalent, which may be employed as the unit 294. A final alternative is that indicated by block 296 wherein a portable data collection system is shown, which could include battery powering of both for operation of the data collection system and also to power the unit 272.

Figure 11:
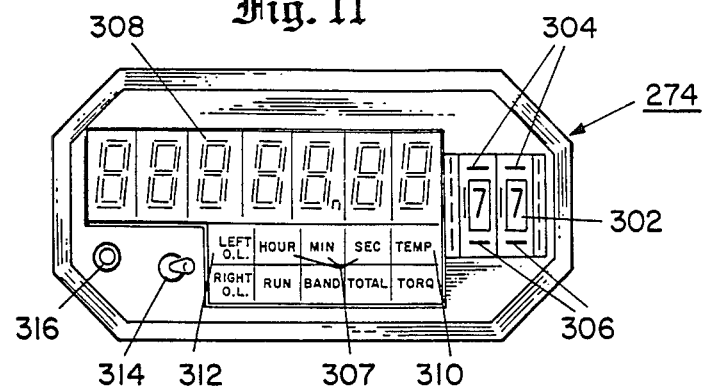
FIGS. 11 and 12 are front and side views, respectively, of a cockpit mounted display unit which may be employed as part of the system.
Figure 12:
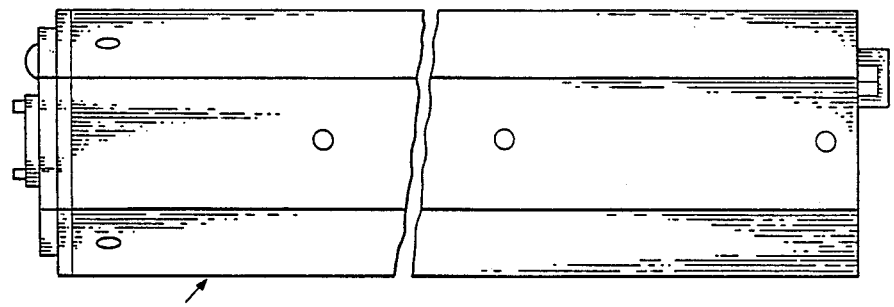

Referring now to FIGS. 11 and 12, they show a front and a side view of the engine-mounted cabin display interrogator 274. To the right in FIG. 11 are the channel number indicators 302, and both the tens digit and the units digit have switches 304 for incrementing the channel numbers in the positive direction and switches 306 for incrementing the channel numbers in the opposite direction. A 7-digit display 308 shows the channel (verified) and the information which has been requested by setting the channel display 302. Thus, channel 8 might represent the time that the left engine, of a two-engine plane has been over a predetermined temperature level, which is above the normal rated temperature for a particular turbine engine. The display 308 would then indicate the time (seconds, minutes or hours) as requested, and one of the indications 307 would be illuminated to indicate the time units being displayed. Other channels may display the actual engine operating parameters as requested. When channel selector 302 is switched to this channel, the display 308 would read the temperature in degrees centrigrade, the LED behind the temperature legend 310 would be illuminated, and the light 312 identifying the left engine, for example, would also be energized. By switching the switches 304 and/or 306, different channels of information may be selected relating to torque, temperature, vibration, engine speed, or other factors, either giving total times, or the times beyond permissible time intervals in various overlimits channels or bands, as may be desired.

The switch 314 may be provided for actuation by the pilot to sample data for trend monitoring purposes, as discussed in greater detail below. It is normally desirable to defer data sampling for trend monitoring until the aircraft has been in flight for a reasonable period of time and stable engine equilibrium and flight stability has been established. The reference numeral 316 in FIG. 11 identifies the ambient light sensor which controls the visual brightness of the displays items 308, 307, 310, 312.

FIG. 13 shows a portable A.C. operated unit, primarily for demonstration purposes, corresponding to the system shown at 276 and 278 in FIG. 10. The engine recorder 279 is shown as a source of signals for the display and computer equipment 276, 278 and 279. In addition, a cabin display interrogator unit 274 is included in the portable arrangements, to permit verification of the operation of the system of FIG. 9 in response to commands given from the unit 274, as well as to interrogations from the portable microcomputer 276 and the associated graphics output unit 278.

FIGS. 14 and 15 are reproductions of actual charts produced by the Radio Shack graphics printer 278. FIG. 14 relates to temperature exceedances, and FIG. 15 relates to torque exceedances. Referring to FIG. 14, it shows in its upper section, the summaries of exceedances, with the various temperature bands being listed to the left of the plots, and the totals represented by each bar graph being set forth to the right of the actual graphics display. It may be noted that the time chart is logrithmic, having the effect of expanding the shorter duration, higher temperature exceedances so that they may be readily observed, while the lower temperature, longer exceedances may also be accurately determined from the bar graphs. Immediately below the bar graphs are summary data indicating the time when the information was obtained, and other key parameters such as the total hours of running time for the engine and the total number of cycles for the engine. In addition, the engine and aircraft numbers are listed to avoid possible improper association of the tabulated data with the wrong aircraft or the wrong engine. The individual temperature exceedances are listed below so that they may be reviewed individually. The reason for this capability is that, in some cases, a series of exceedances beyond the time permitted by the manufacturer, such as four exceedances of one minute each, might not do as much damage as a single exceedance of four minutes. Accordingly, it is desirable to be able to identify the particular exceedance with a high degree of precision to determine the reason for the exceedance, and whether it was justified. Thus, where overhauls of turbine engines cost many thousands of dollars for each overhaul, it is most important for management purposes to control and hopefully eliminate as many exceedances as possible. Further, the knowledge that exceedances will be recorded and pinpointed as to time and date is likely to have a desirable effect on pilots who might otherwise push the aircraft engines beyond their rated temperature or torque limits.

FIG. 15 is similar to the showing of FIG. 14, except that it relates to torque and torque exceedances instead of to temperatures.

FIGS. 16A, 16B, and 16C relate to the determination of engine cycles. Various types of engine cycle determinations are available and the actual type used would be specified by the engine manufacture. These different types of cycles include "start" cycles, "power" cycles, and "fatigue" cycles. FIG. 16A is a simple plot showing a temperature characteristic 322 which rises through a basic temperature level at point 324, runs for a period of time as indicated by the substantially horizontal temperature characteristic portion 326, and then drops through a low temperature point 328 when the engine is turned off, and the engine temperature returns toward the ambient. The microcomputer recognizes the start cycle at point 324, and records the completion of a cycle when the engine temperature passes through point 328. The number of starts is one of the permanently recorded items which is stored in the non-volatile shadow RAM 242 of FIG. 9. When another start cycle is completed, the number stored in the random access memory 242 is withdrawn and incremented to the next higher number and replaced in storage.

FIG. 16B shows a torque characteristic 330 in addition to the temperature characteristic 330 which is similar to the characteristic 322 of FIG. 16A. A power cycle may be defined by the fact that the torque cycle 330 passed through the point 334 representing 60 percent of the normal full allowed power level of the engine. The completion of a power cycle may be identified by the time the temperature or torque drops below a certain prdetermined level, such as point 336 on the temperature cycle, or point 338 on the torque characteristic.

FIG. 16C shows a speed characteristic 342 superposed upon a temperature characteristic 344, which is similar to the plots 322 and 330 of FIGS. 16A and 16B, respectively. When the speed exceeds 70 percent of the rated normal maximum speed of the engine, as indicated by the point 346, a fatigue cycle is recognized. When the speed or the temperature drop below a predetermined levels such as that indicated by the point 348 on the temperature plot, or 350 on the speed plot, the fatigue cycle is recorded. Both power cycles and fatigue cycles may be recorded in the non-volatile store 242, and called up or printed out, upon demand, when suitable signals are applied to lead 250 requesting such information.

Attention will now be directed to the following Table III which gives the overall mode of operation of the system of FIGS. 9 and 10; and to the remaining figures of the drawings which go into somewhat greater detail as to the mode of operation of the system of FIGS. 9 and 10 in terms of program steps, method of analysis, and the like.

TABLE III

Overall Mode of Operation of System of FIGS. 9 and 10

1. Start recognition and recording.
2. Sample and store all input digital data at 10 millisecond intervals.
3. Sample and store all related input data at 10 millisecond intervals.
4. Check for exceedances
    (A) Temperature
    (B) Torque
    (C) Speed
    (D) Vibration
    (E) Helicopter low-g
5. Store data on all exceedance initiations.
6. Update all running tools totals in permanent storage.
7. Shift data on individual exceedances to permanent storage upon completion.
8. Output information as requested, i.e., every two seconds for cockpit display.
9. Check for data interrogation request, and display or transmit any requested information.
10. Trend monitoring data
    A. Record trend data upon trend initiation command either automatically or from the external pilot command.
    B. Calculation and permanent storage of variances.
11. Engine history data plots and print-out.
    A. Starts.
    B. Run Time.
    C. Exceedances: (1) torque, (2) temperature, (3) speed, (4) vibration, and low-g.
        (1) Totals
        (2) Details on individual exceedances
    D. Totals relating to both type of exceedance, and level of exceedance, such as different temperature bands.
12. Engine trend monitoring data
    A. Plot variances
    B. Interpretation The foregoing Table III is substantially self-explanatory, and in the following more specific program charts and diagrams which are included in the drawings, various steps which are generally set forth in Table III will be developed in greater detail.

Figure 17A:
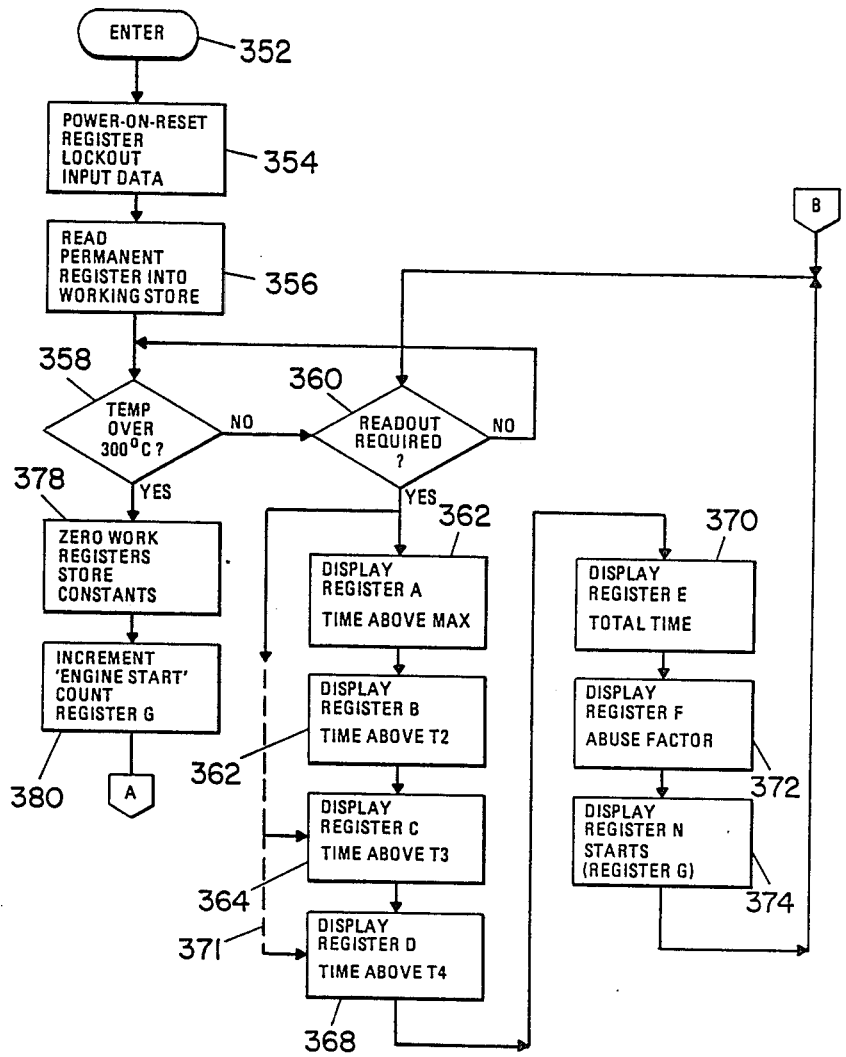
FIGS. 17A and 17B and 18 are charts indicating the steps of operation of the system of FIGS. 9 through 13.
Figure 18:
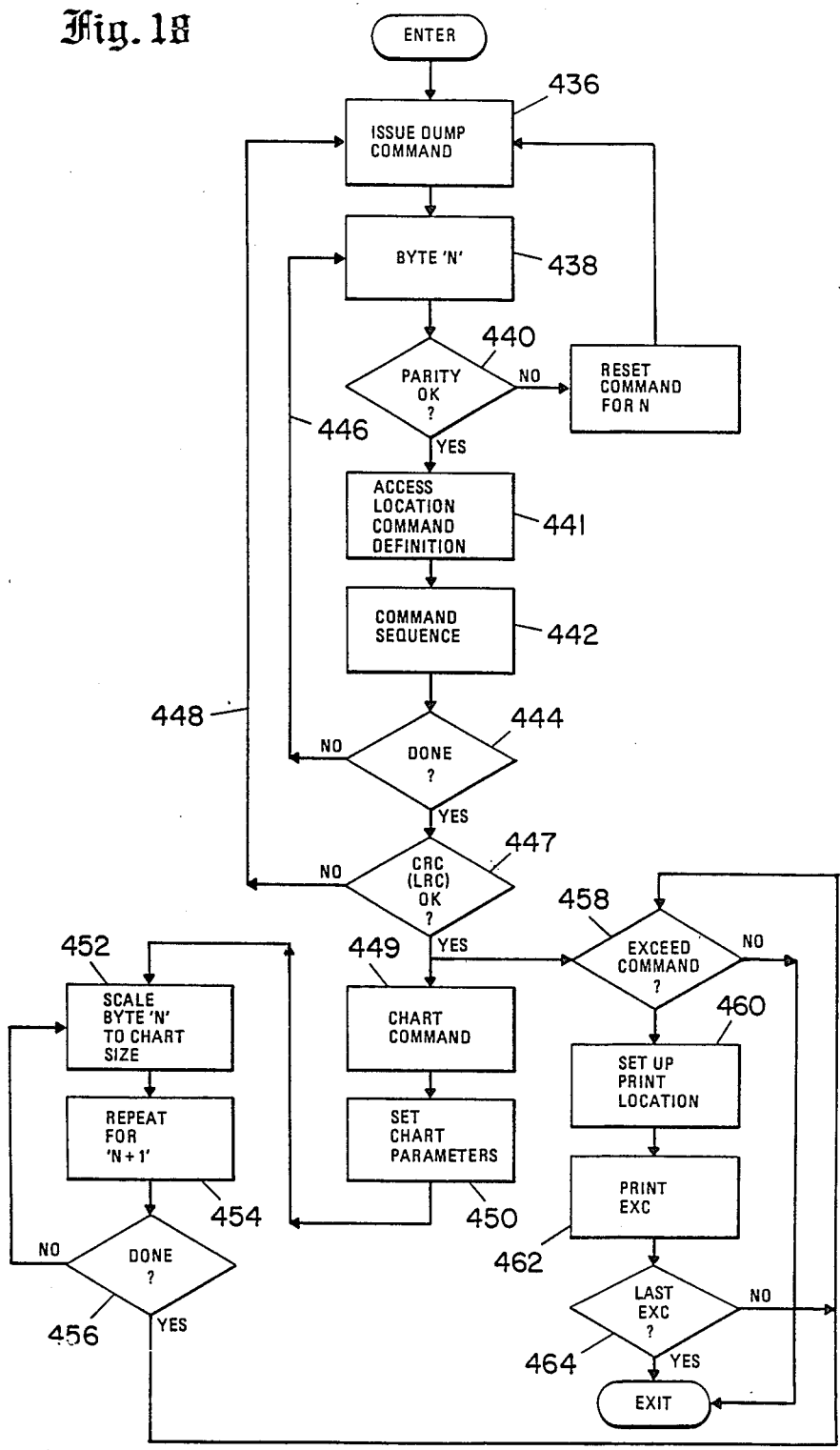

With reference to FIG. 17A from the starting point indicated by block 352, initialization is established as indicated in block 354, and as an initial step, the information in the permanent portion of the shadow random access memory of FIG. 9 is read into a rapid access working store associated with the microcomputer, as indicated by block 356. The decision diamond 358 asks the question, "Is the temperature over 300 degrees C.?", essentially determining whether the engine is running or not. If the answer is "No", the decision diamond 360 asks whether any read-out has been requested, such as an input signal from units shown in the periphery of FIG. 10. If there has been no request for a readout of information, the system cycles back to the block 358.

Returning to block 360, if there has been a readout requested, it would be in the form of a digital number requesting certain types of information from the permanent store, applied on lead or bus 250 of FIG. 9. A typical request might be for all temperature exceedance data, or all torque exceedance data, in which case the data shown in FIGS. 14 and/or 15 would be "dumped" or transmitted to the outside equipment where it would be processed to produce the graph shown in FIG. 14 or the transmitted data would be otherwise processed. Alternatively, the command could be to dump or transmit the entire contents of the permanent store, which would include the trend monitoring data, as discussed in greater detail elsewhere herein.

The cockpit signals from the manually set display 302 (see FIG. 11) are initiated by the cockpit display unit at least once every two seconds, and the cockpit display is updated to conform to the requested information.

In the right-hand side of FIG. 17A, a typical program flow, the various blocks indicate some of the information stored in the registers A through F . . . N of the shadow RAM permanent store of FIG. 9. Thus, block 362 represents the register for storage of the total time the engine has been operated over the maximum time recorded by the system, which in the present case is 849.3 degrees C. Block 364 represents the time above T-2 which is the second temperature level below the maximum level indicated by block 362. Similarly, the blocks 366 and 368 represent the lower limits of additional time bands. In the event the cockpit display or the external command requests the time above temperature T-3, the read-out would immediately provide the requested information, as indicated by dashed line 371 indicating alternative program steps. Additional blocks shown in FIG. 17a include the tool run time indicated by block 370, and abuse factor register 372, and register N designating by block 374 which lists the total engine starts. A large number of permanent storage registers are available, and the contents of a number of these storage registers are listed in Table IV set forth below. Following the dumping of the contents of the selected registers, the sytem cycles back to block 360.

Now, returning to the question block 358, if the temperature is over 300 degrees C., indicating that the engine is operating, a "Yes" answer leads to block 378 indicating that the working registers for receiving new analog data are cleared, and that the contents employed in normalizing or changing the raw input data into usable numerical form are stored, for each input signal. Block 380 indicates the incrementing of the "engine start" counter which may, for example, be stored in Register G, or block 374 shown to the right in FIG. 17A.

TABLE IV

List of Register Contents

Permanent, Non-Volatile Storage

1. Total time over T-Max
2. Total time over T-2
3. Time over T-2 beyond limits
4. Total time over T-3
5. Time over T-4 Beyond limits
6. Total time over T-4
7. Total run time
8. Number of starts
9. Number of power cycles
10. Number of fatigue cycles
11.-16. Set of torque exceedance totals similar to temperature bands
17.-22. Set of speed totals similar to temperature bands
23.-27. Set of low-g exceedance totals similar to temperature bands
28.-37. Details of each of last group of temperature exceedances
38.-47. Details of last ten torque exceedances
48.-57. Details of last ten speed exceedances
58.-67. Details of last ten vibration exceedances
68.-77. Details of last ten low-g exceedances
78.-99. Trend monitoring variances for (A) temperature, (B) Ng Gas generator speed, and (C) Fuel Flow The symbol A in an arrow, at the lower left in FIG. 17A, indicates a transition from FIG. 17A which is on one sheet, to the same function point on FIG. 17B which is on the next sheet.

Figure 17B:
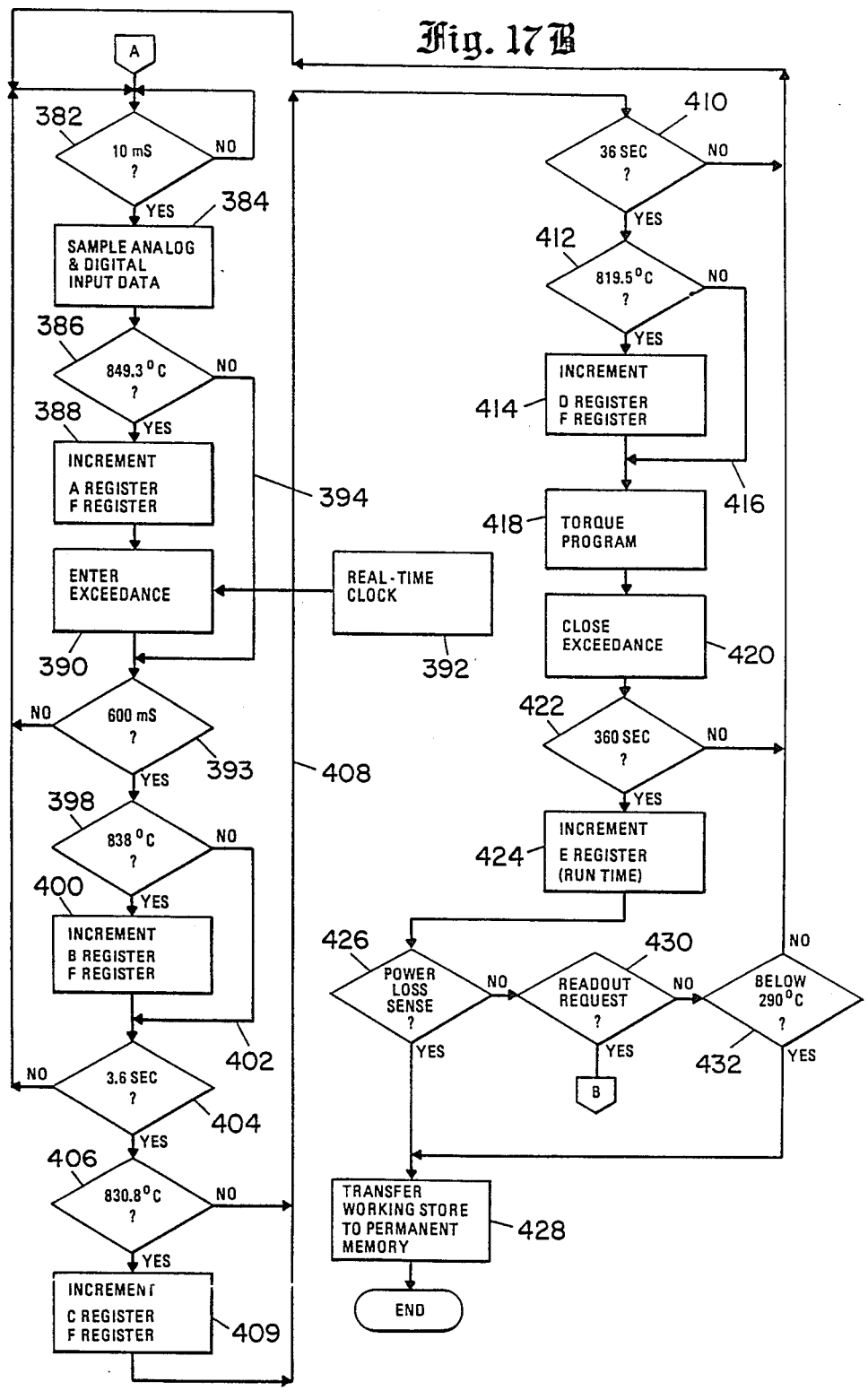

The question diamond 382 in FIG. 17B asks whether the ten millisecond interval between the sampling of the input data which appears to the left in FIG. 9, has elaspsed. In this regard, it has been mentioned previously, that all of the input data is sampled every 10 milliseconds or every 100th of a second. Accordingly, if 10 milliseconds have elapsed, we proceed to block 384 indicating sampling of all the input data which appears to the left in FIG. 9. Following the sampling function, we proceed to the diamond 386 which inquires as to whether the temperature is above 849.3 degrees C., which is the lower limit of the maximum temperature range for which measurements are taken. If the answer is "Yes", then register A, which stores the total time above 849.3 degrees C. is incremented. In addition, using an appropriate weighting factor the engine "abuse" register F is incremented, all as indicated by block 388. Incidentally one suitable circuit for calculating the abuse factor is shown in U.S. Pat. No. 3,931,619, assignee to the assignee of the present invention.

Block 390 is designated "Enter-exceedance". This indicates that the information on the exceedance is being stored, and the "real time clock" 392 block indicates that the time and date of the start of the exceedance is being recorded.

A "No" answer to the question of the temperature level posed by diamond 386 is indicated by the path 394 which extends around blocks 388 and 390 to the diamond 393 which asks the question, "Have 600 milliseconds elapsed?" This is the time interval for sampling at the lower temperature of 838 degrees C. indicated by the diamond 398. Incidentally, the 600 millisecond interval indicated by block 393 is contrasted with the 10 millisecond interval of block 382, which is associated with the higher temperature levels. Incidentally, this carries through in connection with the display shown in FIG. 11, wherein different scales are employed for the displays at different temperature levels, with the timee factor of seconds, minutes or hours being indicated, all as discussed hereinabove. Incidentally, the time scale and severity indexes associated with this abuse are factors provided by engine manufacturer.

If the inquiry about the temperature level of 838 degrees C. posed by the diamond 398 is answered in the affirmative, block 400 indicates incrementing of the B and F registers, with the B register relating to the 838 degree temperature level, and the F register being the abuse factor register. A negative answer to the inquiry leads to the path 402, is similar to the path 394, whereby the incrementing of the appropriate registers is by-passed. Diamond 404 inquires as to whether 3.6 seconds have elapsed. This is the time interval at which the lower temperature of 830.8 degrees C. involving diamond 406, is sampled. As in the prior case, a "No" answer will cause recycling along the path 408 to the diamond 382 at the upper left-hand side of the drawing sheet on which FIG. 17B appears. A "No" answer to the temperature inquiry represented by diamond 406 leads to a bypassing of the increment step 409 and to the cycle associated with the next lower temperature level, involving diamonds 410 and 412. Again, if 36 seconds have not elapsed, recycling to diamond 382 occurs, and if the temperature is not at least as high as 819.5 degrees C., the incrementing register block 414 is by-passed along path 416. The block 418 indicates that a similar cycle relative to torque and speed exceedances is now accomplished. Block 420 designated "close exceedance" indicates that the temperature, torque and speed, have all dropped below the manufacturer's maximum ratings, for normal operation, and the exceedance may therefore be closed.

The total run time of the turbine engine will normally be a relatively large number as compared with the time above the manufacturer's limits, and accordingly, the time interval of 360 seconds or six minutes is established by the diamond 422 associated with the incrementing of the run time register, as indicated by block 424. If 360 seconds have not elapsed, the program recycles to the diamond 382 at the upper left in FIG. 17B. Following incrementing of the run time register, we proceed to diamond 426 inquiring as to whether there has been a power loss. A "Yes" answer means that data in the temporary store of the microcomputer should be shifted to permanent memory for permanent retention and this is indicated by the block 428. Diamond 430 asks the question as to whether or not there has been any readout request, and if so, we shift to the point indicated by the arrow B at the upper right-hand side of FIG. 17A. The next inquiry indicated by diamond 432 is whether the temperature of the engine is below 290 degrees C., indicating that the turbine engine has been turned off. An affirmative answer to this inquiry again leads to block 428, the transfer of the information from the working store to permanent memory.

Now, turning to FIG. 18, this drawing relates to the steps involved in FIG. 10, where information is being transferred from the circuit of FIG. 9 to other units. Let us initially assume that it is desired to print out charts and exceedance data such as those shown in FIGS. 14 and 15 through the use of the units 276 and 278 as shown in FIG. 10. The first step is the issuance of a "dump" command, as indicated by block 436 in FIG. 18, and this command would be routed to the circuit of FIG. 9 on the input lead 250. Information in the form of a series of "bytes" of binary information would then be transmitted over lead 254 of FIG. 9 to the microcomputer 276, as indicated in FIG. 10, and this is indicated by block 438 in FIG. 18. The diamond 440 asks whether the parity check of the transmitted information is "okay" or not. Of course, parity is a method of error checking whereby one or more additional bits of information are added to the data byte to indicate, for example, whether the number is an odd number or an even number, or whether certain digits thereof add up to an odd or even number, all of which is well known per se. The external computer 276 of FIG. 10 must store the received information in a particular address location in its store, indicated by block 441 and the operator must indicate what he wants to have done with the received information, and the formulation of the sequence of steps to implement the desired command, is indicated by the block 442.

The diamond 444 inquires as to whether the steps set forth above have been accomplished in accordance with the capabilities or system built into the computer so that the computer knows what it is to do. A "no" answer recycles the program along line 446 to block 438. However, if the command sequence is an appropriate one acceptable and within the framework wich may be implemented by the computer, we proceed to the diamond 447.

In diamond 440 discussed above, a simple byte-by-byte parity check was accomplished and any byte which did not satisfy the parity check was re-ordered. Now, in block 447 a more complete check of the input data is accomplished through the use of either a cyclic redundancy code (CRC), or a linear redundancy code (LRC), each of which involve known moderately complete redundancy checks. Thus, where two errors in transmitted data would normally not be detected by a simple parity check, such multiple errors would normally be easily recognized by a cyclic or a linear redundancy code. Again, if the redundancy codes do not check out, the information is reordered, and this is indicated by the line 448.

In FIGS. 14 and 15, a chart was prepared indicating the times in certain over limits bands, and then the individual exceedances were printed out. In FIG. 18, the chart command is indicated by the block 449, and this is followed by the block 450 designated "set chart parameters" and then the successive bytes of information are scaled to the chart size, as indicated by the block 452. This step 452 involves established the length of the bar graphs, for example, as shown in FIGS. 14 and 15. Block 454 indicates the repetition of the scaling step of block 452 for the different temperature or torque bands included in each of the graphs. Diamond 456 is a routing computer step asking whether the graph bar code drawing has been completed, and if so, this step of the program is over.

Diamond 458 inquires as to whether there is a command to print out the exceedances, as shown below the graphs, in FIGS. 14 and 15. Following such an exceedance command, the steps as indicated by the blocks 460, 462 and 464 involve setting up a print location for the first exceedance print-out, printing the exceedance, and a determination as to whether or not it was the last exceedance with a negative answer involving recycling to print the next successive exceedance.

Figure 19:
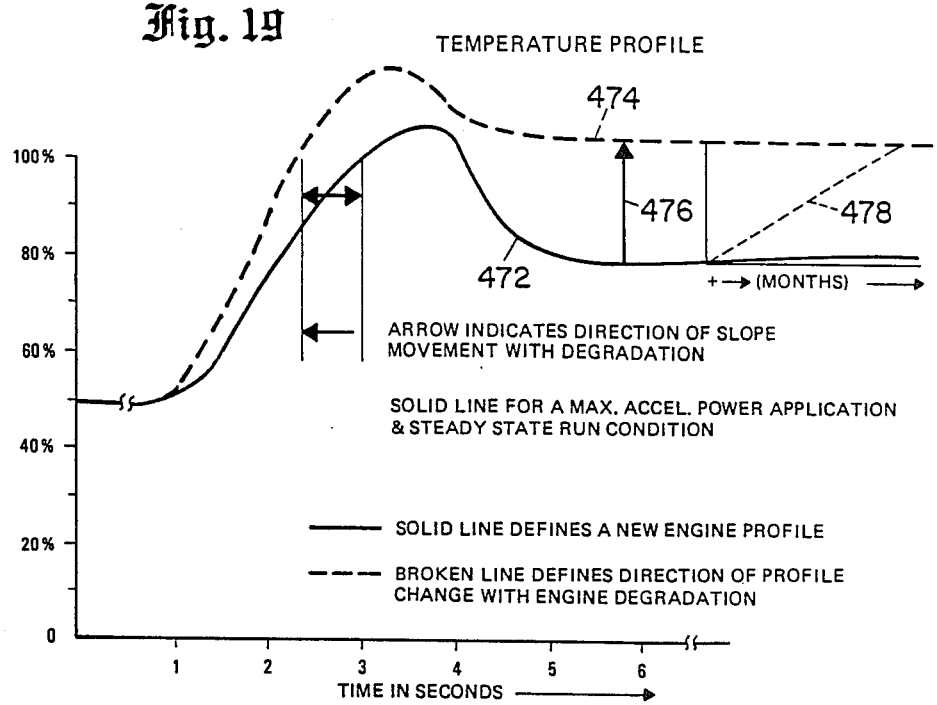
FIGS. 19, 20 and 21 indicate changes in engine operating conditions with time of engine operation, or abuse, useful for trend monitoring purposes.

We will now turn to a consideration of trend monitoring, by reference to FIGS. 19 through 24. FIG. 19 shows the profile 472 of a new turbine engine, indicating the temperature during a few seconds after the turbine engine is turned on; and the dashed line profile 474 indicates the temperature profile of a turbine engine following some substantial period of use at the same power level, and some degradation in the turbine engine, as the blades became worn and perhaps slightly deformed from long use or abuse. Under stable operating conditions, the arrow 476 indicates qualitatively the type of shift in the operating temperature of the engine, while the aircraft is operating, for example, at the same speed, elevation, and under other normalized conditions. The change in the stable conditions following the passage of substantial periods of time, is indicated by the dashed line 478.

Figure 20:
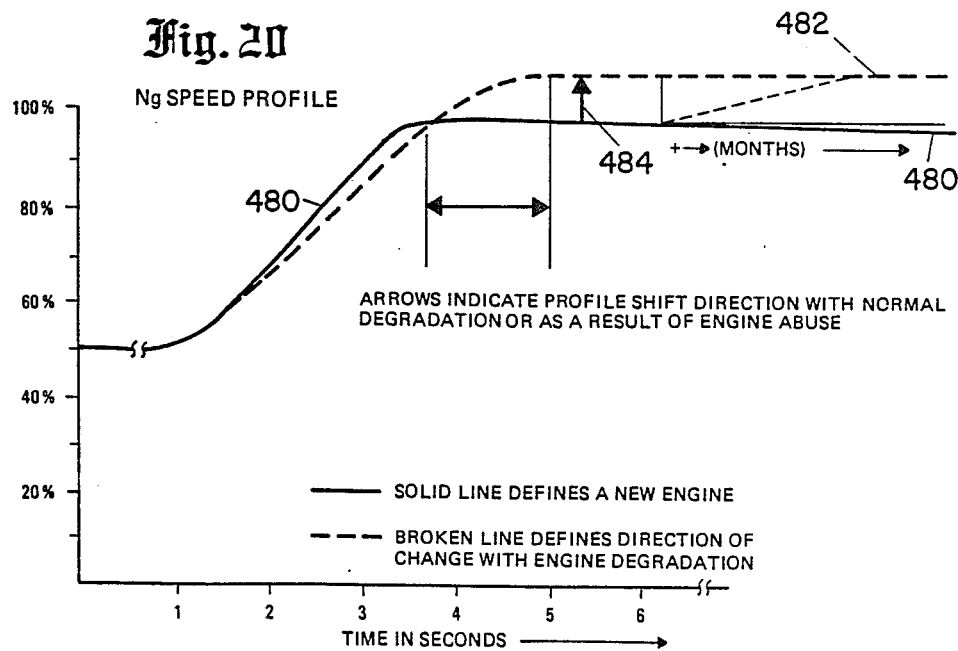

FIG. 20 is a set of plots similar to those of FIG. 19, but relating to the compressor fan speed, again with the solid line plot 480 representing the characteristic or profile of a new engine, and the dashed line 482 representing that of the engine which has been used for many months or abused for shorter periods of time. It may be noted essentially, that, as the degradation progresses, a higher rate of rotation of the compressor or fan is required, in order to produce the same power levels, and this variance is indicated by the arrow 484, where the degraded performance shows a longer time to reach operating speed and correspondingly a higher operating speed to obtain the same level of performance.

Figure 21:
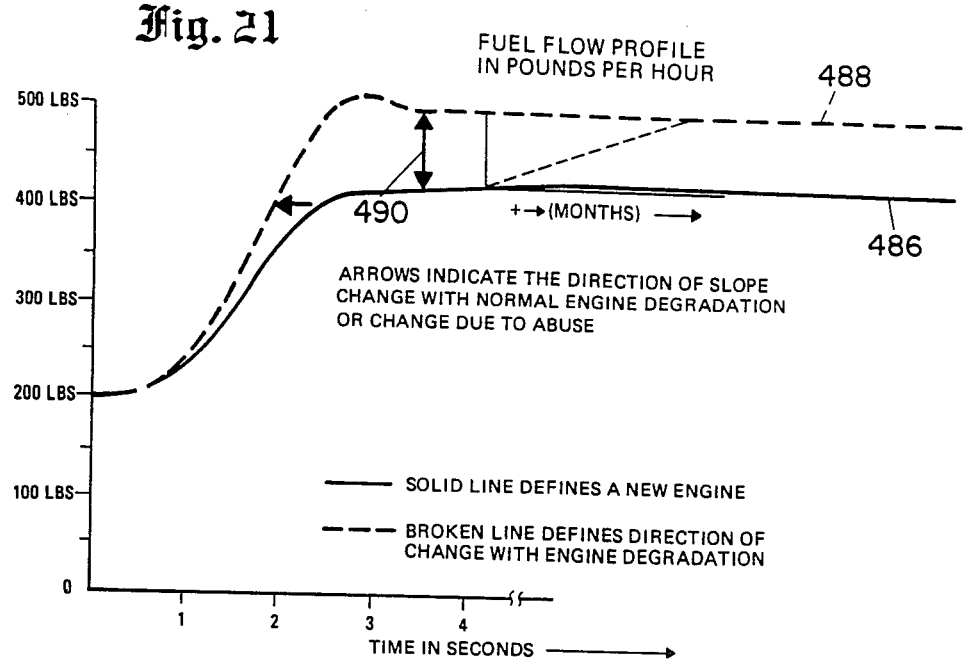

FIG. 21 is a similar graph for fuel flow, with the profile 486 in a solid line, representing the lower fuel flow for a new engine as compared with the dashed line plot 488 showing the higher fuel flow required to, produce the same horsepower for normalized conditions with a worn engine or one which has been subject to degradation. The arrow 490 indicates departure or variance in fuel flow with engine degradation.

As mentioned above, for power assurance purposes, the engine is cycled through a periodic low or fractional power cycle while the aircraft is still on the ground. The characteristics corresponding to 472 and 474 are sampled during the first few seconds of the power cycle and the amplitude of the temperature peak and the slope of the characteristic are examined to indicate the engine condition. In the event that the engines are in need of immediate overhaul, so that one engine of a two engine helicopter could not fly the craft to a safe landing, a decision may be made not to take a possible planned flight or reduce payload.

As mentioned hereinabove, the switch 314 in FIG. 11, corresponds to the input 492 in FIG. 9, and is operated by the aircraft pilot for the purpose of recording trend monitoring data after the aircraft has been warmed up and is under stable flight operating conditions. When this switch is operated, all of the data necessary for trend monitoring is recorded.

Several steps are necessary in order to convert the recorded input information into trend monitoring variances of the type indicated in FIGS. 19, 20 and 21, so that they may be plotted and employed for engine analysis purposes. The steps involved in the determination of the trend monitoring variances include first, a calculation of the actual horsepower being used under the stable operating conditions under which the data was taken, normlization of the horsepower data using a density index factor, and from this data, a calculation may be made of the idealized fuel flow in pounds per hour, the engine temperature, and the engine speed $N_g$, all on a normalized basis. These optimum figures are then compared with the actual engine speed $N_g$, the actual engine temperature, and the actual fuel flow in pounds per hour, and the variance from the normalized optimum figures are calculated.

Figure 24:
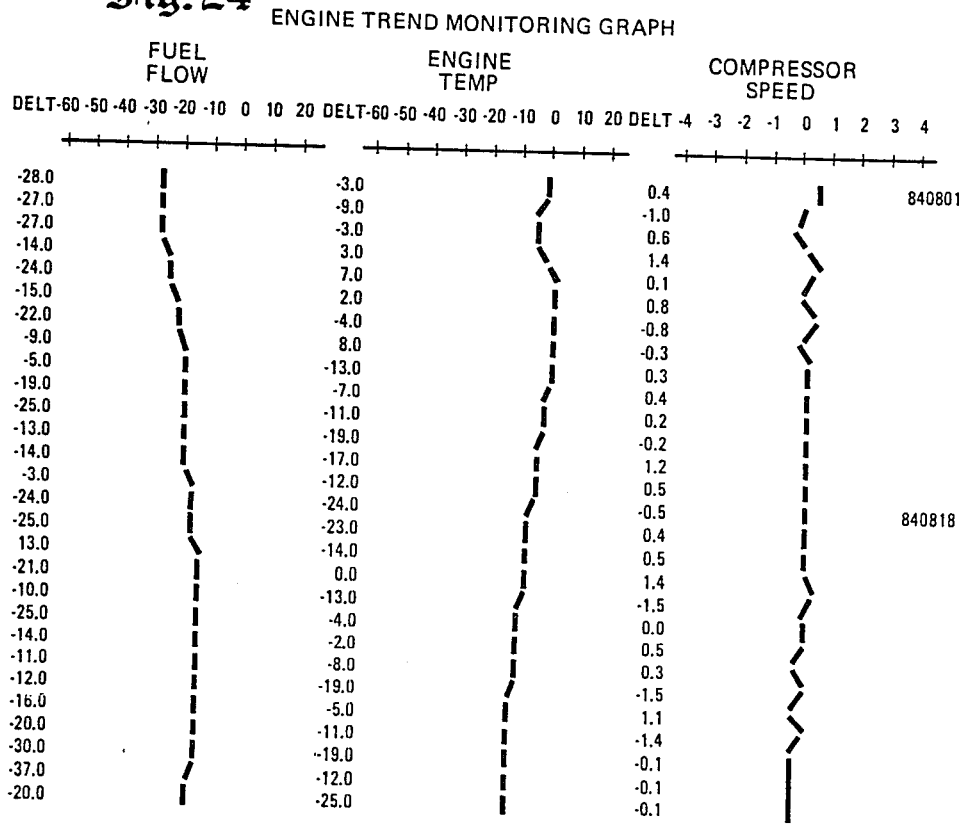
FIG. 24 is a plot of trend monitoring variances of fuel flow, engine temperature and compressor speed with time.

The variances are plotted as indicated in FIG. 24, for fuel flow, engine temperature and compressor speed. Incidentally, sometimes the initial settings of the turbine blade clearances are adjusted with relatively large tolerances. Then, as the engine heats up and some hours of flight take place, perhaps there will be some stretching and reduction in the tolerances, with the result that, with the tighter tolerances, some improvement in engine performance may be observed. However, this initial improvement normally will not last, and degradation of the type indicated in FIGS. 19, 20 and 21 will set in after substantial periods of time. One maintenance step which may produce a significant improvement in operation is the washing of the turbine blades, eliminating stray particles which may have adhered to the blades in a manner remotely similar to the way bugs may adhere to a automobile windshield. Following such a turbine blade wash, the variances will often decrease significantly.

Now that the general nature of the trend monitoring process has been discussed, we will go to one particular example involving a United Aircraft PT6A-20 engine. In this regard, attention is directed to FIG. 23 of the drawings in which the manufacturers supplied chart involving shaft horsepower, an air density index, fuel flow in pounds per hour, engine temperature and speed, is shown. In using the chart of FIG. 23, the density index is intially calculated using the known aircraft altitude, and the outside air temperature. Using known formulations, with an altitude of 19,000 feet, and a temperature of −27 degrees C., the density index factor is determined to be 0.56. It is understood that this density index relates to the ratio of the actual conditions to the Standard Atmosphere. Thus, at an altitude of 19,000 feet and a temperature of −27 degrees Celsius, the density is 0.56 that of one atmosphere, or of atmospheric pressure and density at sea level under standard conditions.

From FIG. 9, both torque and engine speed are sampled, and the product of the torque and the engine speed is equal to the shaft horsepower. In the present case, the horsepower was calculated to be equal to 240. Now, referring to FIG. 23, the 0.56 density index line is followed by the set of arrows 502. The 240 horsepower curved line is designated by the reference numeral 504. These two lines intersect at the point 506. Now, from this intersection point, the ideal normalized fuel flow, engine temperature, and engine speed may be calculated. More specifically, the fuel flow lines run diagonally from upper left to lower right in FIG. 23, and by extending from point 506 upwardly and to the left parallel with the fuel flow lines, the arrows 508 lead us to an indication of a fuel flow figure. Extending upwardly and to the left along the line indicated by the arrows 508, it may be seen that the normalized fuel flow for the conditions provides a fuel flow of slightly less than 170 pounds per hour or approximately 168 pounds per hour. This figure is compared with the actual fuel flow as measured at input 182 in FIG. 9, and the variance is plotted at the proper date at which the reading was taken, in the left-hand plot of FIG. 24. Incidentally, in FIG. 24, successive entries may be taken on successive days of operation, or successive increments such as five-hour increments of run time of the turbine engine under consideration. The actual numbers which appear to the left are the figures represented by the lines on the plot.

Returning to FIG. 23, the horizontal line 510, accompanies by the arrows, show us the readings on the temperature and engine speed scales, indicating the optimum engine operating temperature and engine speed, for a new engine. More specifically, the engine temperature appears to be approximately 622 or 623 degrees C., and the engine speed appears to be approximately 91.5 percent of the maximum rated speed. As in the case of the normalized fuel flow figure, these engine speed and temperature figures are compared with the actual engine speed and temperature figures as provided by the sensors at inputs as shown to the left in FIG. 9, and the variances are plotted as indicated in FIG. 24.

Figure 22:
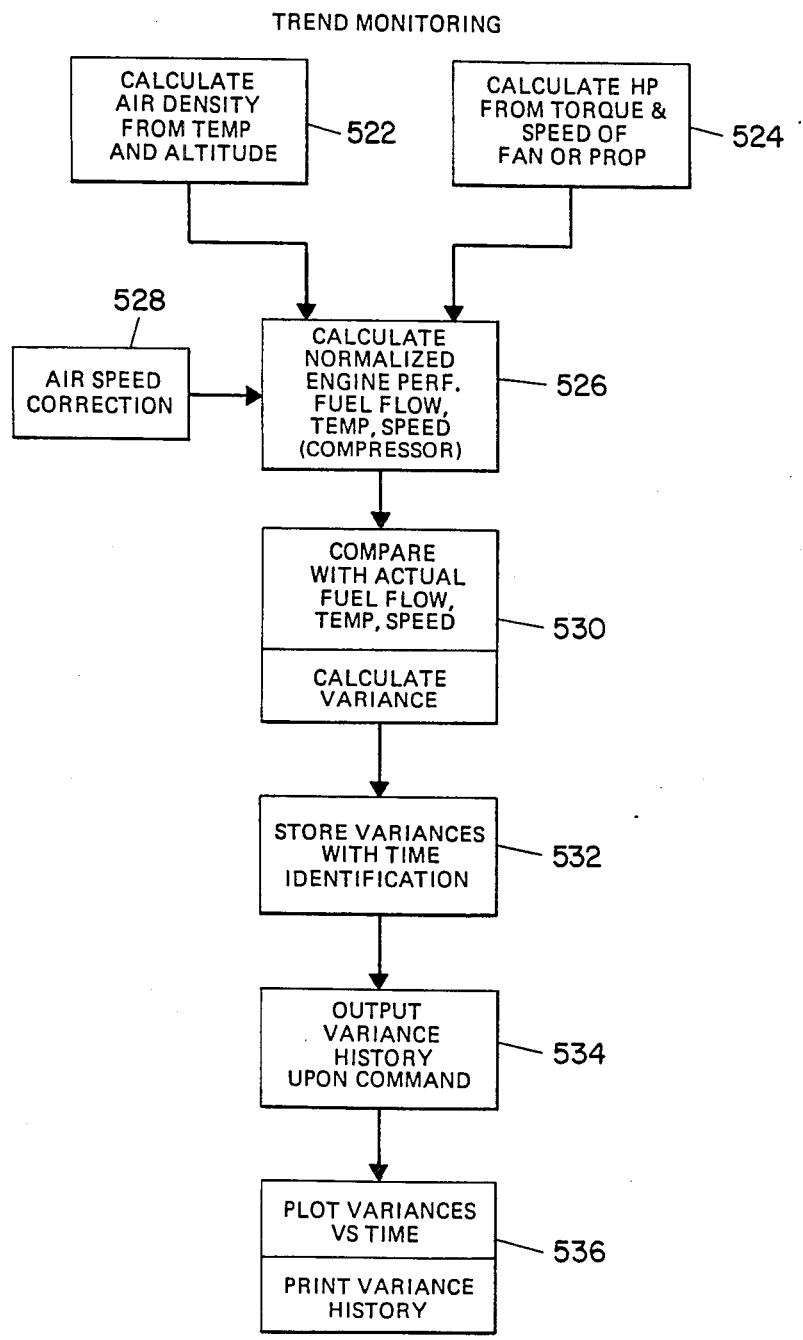
FIG. 22 is a plot of steps undertaken in trend monitoring analysis.
Figure 23:
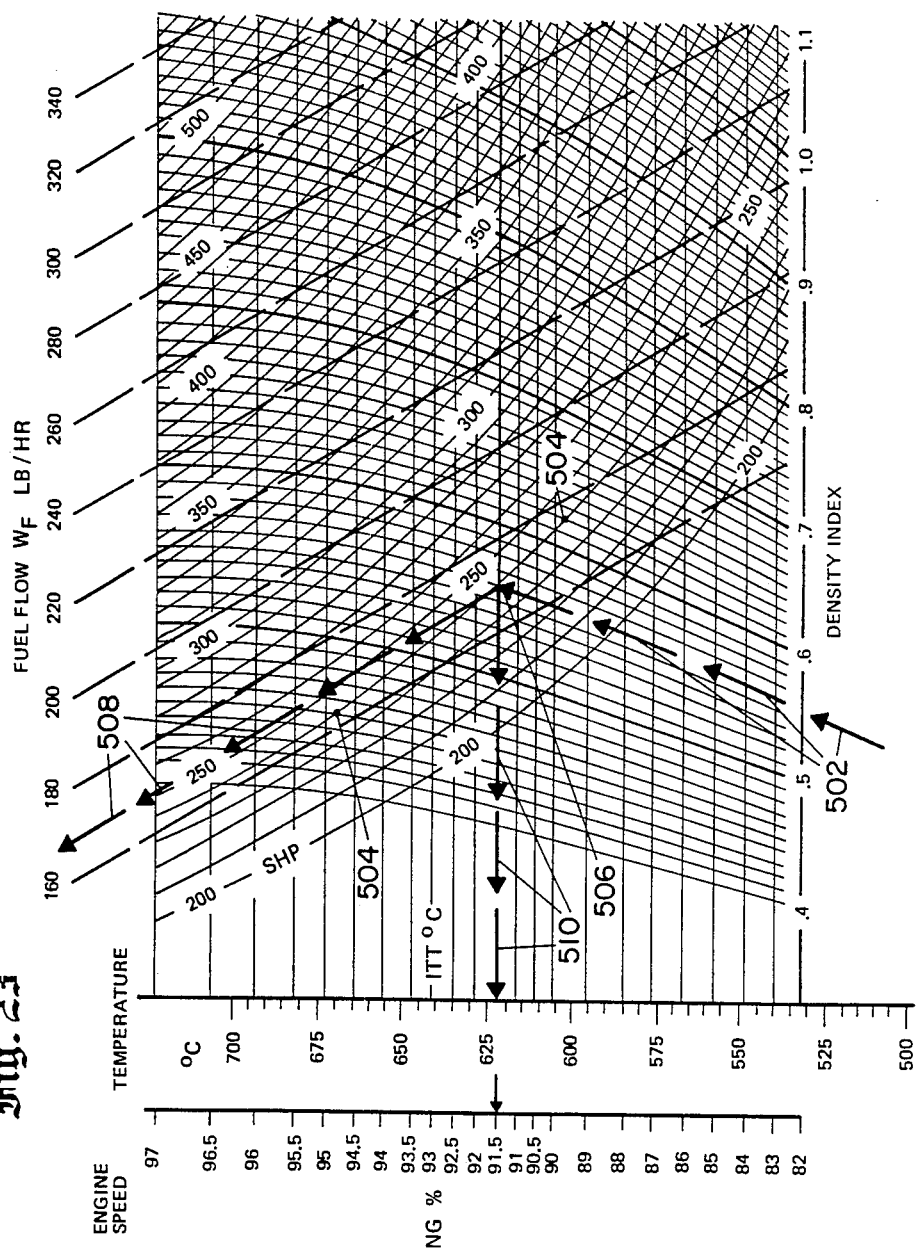
FIG. 23 is a showing of a set of plots which are manually employed in calculating engine rotation speed and fuel flow.

FIG. 22 indicates the steps involved in trend monitoring, performed "manually" or graphically, and they start with the calculation of the air density from the temperature and altitude, as indicated by block 522; and the shaft horsepower is calculated from the torque inputs and the speed of the turbine fan or the propeller in a turbo-prop engine, as indicated by block 524 in FIG. 22. The next step is to calculate the normalized engine performance in terms of fuel flow, temperature and turbine speed (gas generator Ng), as indicated by the block 526, with an air speed correction being included as indicated by the block 528. The comparison with the actual fuel flow, temperature, and speed, and the calculation of the differences in terms of the actual temperature or the percentage variance, is indicated by the block 530 in FIG. 22. The variances are then stored in the computer memory, along with an indication of the time at which the trend monitoring data was recorded, and this is indicated by the block 532. Block 534 indicates the withdrawal from storage of the variance history on command, and block 536 shows the plotting of the variances with time, as indicated in FIG. 23; alternatively, the variance history may be printed out.

In the foregoing discussion, the steps for determining the normalized fuel flow, temperature and engine speed, given the density index and the horsepower were shown, on a graphical basis. In addition, these factors may be calculated by formulas which are available for each aircraft, and are provided by the aircraft manufacturer. Of course, these formulae, although similar, differ for each type of aircraft and aircraft engine. Instead of manually following the graph lines, in connection with the showing of FIG. 23, these steps are computed mathematically, and the idealized fuel flow, temperature, and engine speed are determined from formulas. The resultant data is then compared with the actual measured data, and variances determined and stored.

Reference will now be made back to FIGS. 9A and 9B of the drawings which involve the low-g helicopter warning system of the present invention. More specifically, with reference to FIG. 9A, the accelerometer 602 is mounted in the fuselage of a helicopter near the center of gravity, such as that shown in FIG. 25 of the drawings. The accelerometer may, for example be of the type made by Sensotec, 1200 Chesapeake Avenue, Columbus, Ohio 43212; or of the type made by Columbia Research Laboratories, Inc., available through FLW, Inc., 2930 C Grace Lane, Costa Mesa, CA 92626.

The output from accelerometer 602 is amplified and filtered in circuit 604 with the low pass filter in circuit 604 blocking the rotor blade frequency of above two cycles per second, or two hertz. Signals from circuit 604 are applied over lead 606 to the input analog multiplexing and signal conditioning circuit 176. The analog acceleration or "g" signals are converted to digital signals by the circuit 204 and supplied to the microcomputer 186.

Now, concerning the dangerous low-g signals, a series of bands are established as follows:

TABLE V

| Low-g Channel No. | Acceleration Range | Warning Light | Warning Sound | Recorded In Band |
|---|---|---|---|---|
| 1 | Above 0.55 g | No | No | No |
| 2 | 0.45 to 0.55 | Yes | No | Yes |
| 3 | 0.35 to 0.45 | Yes | Dual Tone Warble | Yes |
| 4 | 0.25 to 0.35 | Yes | D. T. Warble | Yes |
| 5 | 0.15 to 0.25 | Yes | D. T. Warble | Yes |
| 6 | 0 to 0.15 | Yes | D. T. Warble | Yes |

In considering the foregoing Table V, it may be recalled that 1-g is the normal force or acceleration due to gravity when a body is at rest. When a body is in free fall, in accelerometer on the body will indicate 0-g.

As noted above, when a helicopter has a powered descent or a maneuver which reduces the vertical acceleration sensed by an on-board accelerometer to less than about 0.45 g, the helicopter rotor blades will have a substantial downward deflection, and there is a significant danger of the rotor blades striking the tail or the body of the helicopter.

The low-g bands set forth in Table V are stored in the PROM 240 in FIG. 9B, and the received acceleration or "g" signals are compared with the stored bands, and the warning light and audio signal are energized progressively as indicated in Table V. Digital signals from microcomputer 186 are supplied over circuit 608 to the logic circuit 610. The visual alarm signal 612 is actuated via amplifier 614, and the audio warning signal is supplied to the intercom system 616 at the desired intensity level from the warble tone generator circuit 618. It may be noted from Table V that the initial signal at a low-g level of from 0.45 g to 0.55 g is a warning light. At the next lower band, 0.35 g to 0.45 g, a low level audio warning signal is also supplied to the pilot's headset through the intercom system. Incidentally, in the present case, the circumstances when the "g" readings go below predetermined dangerous levels will be referred to herein as "exceedances", although the actual value of the "g" figures will be going below and not above predetermined levels.

Concerning an additional point, a self test circuit is included in accelerometer circuit 602 of FIG. 9A. More specifically, the test circuit provides a fixed offset on command, to simulate a low-g condition. The microprocessor is programmed to detect this change in the "g" signal, and indicate an acceptable or non-acceptable test result. This test may be accomplished by inserting a resistive load into the accelerometer output circuit.

In summary, therefore, the present comprehensive engine monitoring system not only provides detailed information relative to the nature of the exceedances, but also includes all data inputs required for, and the capability of trend monitoring, by calculating and plotting variations in fuel flow, temperature, and engine speed, as compared with the normalized ideal figures for a new turbine engine.

In conclusion, it is to be understood that the foregoing is a description of illustrative, preferred embodiments of the invention. Other electronic circuit arrangements for implementing the functions described hereinabove may be employed. By way of example, but not of limitation, other logic chips may be employed to implement the indicated function without departing from the spirit and scope of the invention; a series of thermocouples, resistance thermometers, optical temperature sensors, or any other means for measuring temperature, located at desired points along the turbine engine may be used instead of the schematic indication of a single thermocouple as shown in the drawing; and it is to be expected that the values as set forth in Table I and in FIG. 8 will vary from one turbine engine to another and that these are merely representative of particular engines under consideration. Also, differences in display and switching arrangements are expected between cockpit mounted and portable test units, and when one or three or four engine planes are involved, for example. It is also to be noted that all of the functions as described herein need not be included in every system; instead, it is to be expected that user requirements and needs will differ, and that most systems will use some but not all of the capabilities as disclosed hereinabove. Accordingly, the present invention is not limited to the particular systems as shown in the present drawings and as described in this specification.

What is claimed is:

1. A comprehensive digital monitoring and recording system for turbine engine powered helicopters wherein the helicopter and turbine engine have predetermined normal operating parameters, said system comprising:
   means for sensing the temperature of said turbine engine;
   means for sensing the acceleration or "g" force acting vertically on said helicopter;
   digital data processing means for determining exceedances indicating operation of said turbine engine over the normal operating temperature of said engine and when said "g" force drops below predetermined levels;

non-volatile storage means for permanently storing data giving the duration and magnitude of each said exceedance, and the total duration of the exceedances; and means for providing a warning signal to the pilot when the "g" force reaches a predetermined low level.

2. A comprehensive monitoring and recording system as defined in claim 1 further including means for recording the time of occurrence of each exceedance.

3. A comprehensive monitoring and recording system as defined in claim 1 wherein means are provided for permanently recording the low-g exceedances in accordance with successive low-g bands below the safe acceleration level for said helicopter.

4. A comprehensive monitoring and recording system as defined in claim 1 further comprising means for selectively transmitting all or selected portions of the permanently stored data to a location spaced from said system, upon command.

5. A system as defined in claim 4 further comprising means for displaying selected data transmitted from said system.

6. A system as defined in claim 5 wherein said displaying means is a cockpit numerical display unit including switching means for selecting desired information to be displayed.

7. A helicopter low-g warning system comprising:

accelerometer means for mounting in the fuselage of a helicopter for measuring vertical low-g conditions;

means for digitizing the output of said accelerometer;

memory means for storing digital information indicating predetermined dangerous helicopter low-g conditions;

digital data processing means for determining whether the digitized acceleration signals are less than the stored information indicating predetermined dangerous low-g conditions; and means for providing a warning to the helicopter pilot when the sensed acceleration is below the predetermined dangerous low-g conditions.

8. A helicopter low-g warning system as defined in claim 7 including means for storing information defining a plurality of successive bands of dangerous low-g conditions; and means for providing additional warning to the helicopter pilot as the acceleration drops to lower, more dangerous bands.

9. A helicopter low-g warning system as defined in claim 7 further comprising non-volatile digital storage means for storing the magnitude, duration and time of each exceedance, involving low-g conditions below said predetermined low-g conditions.

10. A system as defined in claim 7 further including means for sensing and recording temperature exceedances involving operation of the helicopter engine above rated temperatures.

11. A system as defined in claim 7 further including means for sensing and recording torque exceedances involving operation of the helicopter engine above rated torque levels.

12. A system as defined in claim 7 further comprising non-volatile memory means for storing exceedance data relating to occasions where said low-g conditions are less than said predetermined dangerous levels.

13. A system as defined in claim 7 further comprising means for providing both an audio and a visual warning to the helicopter pilot.

14. A comprehensive digital monitoring and recording system for turbine engine powered helicopters wherein the helicopter and turbine engine have predetermined normal operating parameters, said system comprising:

means for sensing the temperature of said turbine engine;

means for sensing the acceleration or "g" force acting on said helicopter;

digital data processing means for determining exceedances indicating operation of said turbine engine over the normal operating temperature of said engine and when said "g" force drops below predetermined levels;

storing data relating to each said exceedance; and means for providing a warning to the pilot when said exceedances reach predetermined levels.

15. A comprehensive turbine engine monitoring and recording system as defined in claim 14 further including means for recording the time of occurrence of each exceedance.

16. A comprehensive turbine engine monitoring and recording system as defined in claim 14 including multiplexing means for selectively sampling a signal from said temperature sensing means and a signal from said acceleration sensing means, and means for converting the sampled signals from analog to digital form.

17. A helicopter low-g warning system as defined in claim 14 including means for storing information defining a plurality of successive bands of dangerous low-g conditions; and means for providing additional warning to the helicopter pilot as the acceleration drops to lower more dangerous bands.

18. A helicopter low-g warning system as defined in claim 14 further comprising non-volatile digital storage means for storing the magnitude, duration, and time of each exceedance, involving low-g conditions below said predetermined low-g conditions.

19. A system as defined in claim 14 further including means for sensing and recording torque exceedances involving operation of the helicopter engine above rated torque levels.

* * * * *